United States Patent [19]

Watanabe

[11] Patent Number: 5,739,856
[45] Date of Patent: Apr. 14, 1998

[54] PHOTOGRAPHIC SUBJECT POSITION PREDICTING APPARATUS

[75] Inventor: Toshimi Watanabe, Machida, Japan

[73] Assignee: Nikon Corporation, Chiyoda, Japan

[21] Appl. No.: 807,954

[22] Filed: Feb. 28, 1997

Related U.S. Application Data

[63] Continuation of Ser. No. 319,024, Oct. 6, 1994, abandoned.

[30] Foreign Application Priority Data

| Oct. 7, 1993 | [JP] | Japan | 5-251992 |
| Oct. 7, 1993 | [JP] | Japan | 5-251993 |
| Oct. 7, 1993 | [JP] | Japan | 5-251994 |

[51] Int. Cl.⁶ ............... H04N 5/232; G03B 13/00
[52] U.S. Cl. ............... 348/349; 348/352; 348/354; 396/95; 396/104; 396/153
[58] Field of Search ............... 348/345, 349, 348/351, 352, 353, 354, 355, 356; 396/72, 79, 95, 104, 153; H04N 5/232

[56] References Cited

U.S. PATENT DOCUMENTS

| 4,860,045 | 8/1989 | Hamada et al. | 354/402 |
| 4,967,224 | 10/1990 | Hamada et al. | 354/402 |
| 5,012,267 | 4/1991 | Higashihara et al. | 354/402 |
| 5,061,951 | 10/1991 | Higashihara et al. | 354/400 |
| 5,061,953 | 10/1991 | Higashihara et al. | 354/402 |
| 5,089,843 | 2/1992 | Higashihara et al. | 354/402 |
| 5,379,088 | 1/1995 | Ueda et al. | 354/402 |
| 5,404,013 | 4/1995 | Tajima | 250/332 |
| 5,475,466 | 12/1995 | Iwasaki et al. | 354/432 |
| 5,477,302 | 12/1995 | Ogasawara | 354/400 |
| 5,619,300 | 4/1997 | Watanabe et al. | 396/95 |
| 5,649,241 | 7/1997 | Watanabe | 396/153 |

*Primary Examiner*—Andrew Faile
*Assistant Examiner*—Ngoc-Yen Vu
*Attorney, Agent, or Firm*—Oliff & Berridge

[57] ABSTRACT

A photographic subject position predicting apparatus according to the present invention is provided with a focal point detection device that detects the focal point adjustment state of the photographic lens, a moving speed detection device that detects the moving speed of the photographic subject, a prediction time calculation device that calculates the photographic subject position prediction time in accordance with the photographic subject moving speed detected by the moving speed detection device, and a prediction device that predicts the photographic subject position after the photographic subject position prediction time has elapsed, based upon the focal point adjustment state detected by the focal point detection device.

13 Claims, 21 Drawing Sheets

PHOTOGRAPHIC SUBJECT POSITION PREDICTING APPARATUS

This is a Continuation of application Ser. No. 08/319,024 filed Oct. 6, 1994 now abandoned.

BACKGROUND OF THE INVENTION

1. Field of the Invention

The present invention relates to a photographic subject position predicting apparatus which is provided in a camera or the like, to predict the future position of a photographic subject (moving object) to be photographed and in particular, to prevent undesirable hunting of the photographic lens.

2. Description of the Related Art

U.S. Pat. Nos. 5,012,267 and 5,089,843 disclose automatic focal point adjustment devices which predict the position of a photographic subject that travels within the viewfinder of a camera after a specific length of time (hereafter referred to as photographic subject prediction time, or simply prediction time) has elapsed, and perform focal point adjustment for the photographic lens based upon the results of the prediction. In the former device, the photographic subject prediction time described above is fixed, while in the latter device, the photographic subject prediction time changes in correspondence with the direction in which the photographic subject moves.

However, since a significant amount of time is required for lens drive to focus the photographic lens on the photographic subject, there is a problem that if the photographic subject is moving fast, the movement of the lens cannot keep up with the movement of the photographic subject and thus focusing cannot be performed unless the photographic subject position is predicted relatively far into the future, i.e., unless the aforementioned photographic subject prediction time is lengthened. On the other hand, if the movement of the photographic subject is slow, the amount of error inherent in the detected photographic subject moving speed is large, and as a result, if lens drive is performed with the photographic subject position being predicted too far in the future, there is a likelihood that hunting of the photographic lens will occur. In every device in the prior art, the photographic subject prediction time is not adjusted in correspondence to the speed at which the photographic subject moves, and therefore, problems such as those mentioned above tend to occur when the speed of the photographic subject is either high or low.

Also, in U.S. Pat. Nos. 5,061,953 and 5,061,951, devices are disclosed which determine whether or not the photographic subject for which current focal point detection has been performed is identical with a photographic subject for which focal point detection was performed in the past, and which prohibit photographic subject position prediction if these photographic subjects are determined to be different. With these devices in the prior art, if the intended photographic subject momentarily goes out of a specific focal point detection area in the subject field, or if an object crosses in front of the intended photographic subject to block the intended photographic subject, for example, a decision is made that the photographic subjects are not the same, and photographic subject position prediction and lens drive for the first photographic subject is immediately prohibited and photographic subject position prediction and lens drive are performed for the new photographic subject. However, unless the frame is moved intentionally, the first photographic subject will quickly re-emerge within the focal point detection area and photographic subject position prediction and lens drive are resumed for the first subject. Thus, when photographic subjects for which photographic subject position prediction and lens drive=are performed change frequently, the photographic lens tends to hunt, as described earlier.

Furthermore, U.S. Pat. Nos. 4,860,045 and 4,967,224 disclose a device which, when the detected defocusing quantity is larger than a specific value, does not recognize the intended photographic subject as a moving object. In other words, generally speaking, when the defocusing quantity is large, a great deal of error is inherent in the defocusing quantity, and this can result in erroneous detection of a moving object. Such a detection error is prevented by not recognizing the photographic subject as a moving object under these conditions. However, with this method, even when the defocusing quantity is large because of a fast-moving photographic subject, the photographic subject is not recognized as a moving object. That is, the problem occurs that the photographic subject is not recognized as a moving object even thought it is a moving object. This tends to cause hunting of the photographic lens when there are frequent changes in the speed at which the photographic subject moves.

SUMMARY OF THE INVENTION

The object of the present invention is to provide a photographic subject position predicting apparatus in which undesirable hunting of the photographic lens is prevented.

In order to achieve the object described above, the photographic subject position predicting apparatus according to the present invention is provided with a focal point detection device which detects a focal point adjustment state of a photographic lens, a moving speed detection device which detects a moving speed of a photographic subject, a prediction time calculation device, which calculates a photographic subject position prediction time in accordance with the photographic subject moving speed detected by the moving speed detection device and a prediction device which predicts the photographic subject position after the photographic subject position prediction time has elapsed, based upon the focal point adjustment state detected by the focal point detection device.

In the present invention, the photographic subject position prediction time is calculated based upon the photographic subject moving speed. The photographic subject position after this photographic subject position prediction time has elapsed, is predicted based upon the focal point adjustment state. As a result, problems such as the lens movement being unable to keep up with the movement of the photographic subject and, therefore, the photographic lens being unable to focus when the photographic subject moving speed of the photographic subject is high, are prevented. At the same time, even if the error contained in the photographic subject moving speed is large when the photographic subject moving speed of the photographic subject is low, hunting of the photographic lens does not occur.

DETAILED DESCRIPTION OF THE PREFERRED EMBODIMENTS

First Embodiment

The first embodiment according to the present invention is explained in reference to FIGS. 1–19.

Figure 1:
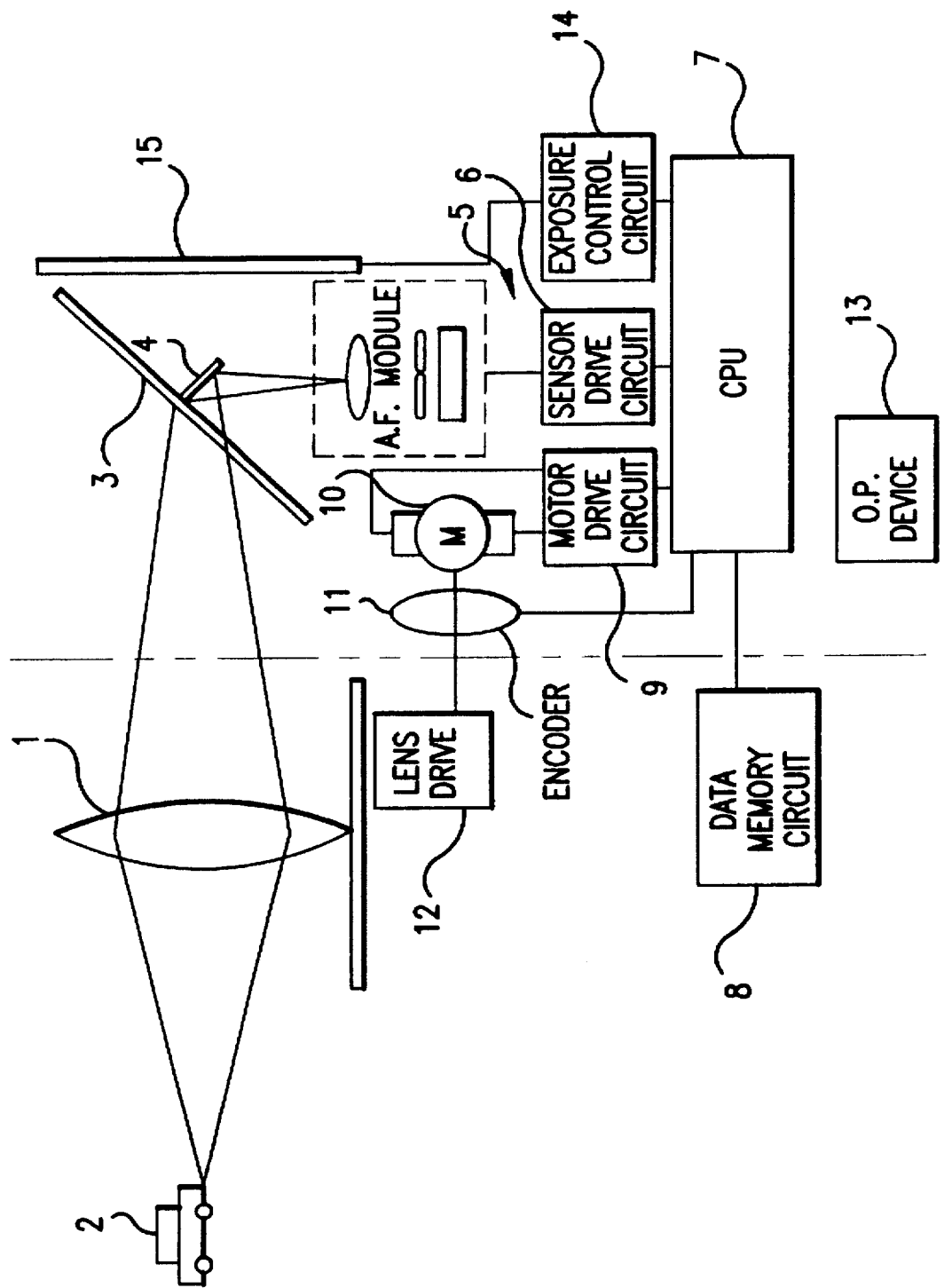
FIG. 1 is a block diagram showing an automatic focusing device according to the present invention.

FIG. 1 is a block diagram showing the structure of the control system of a single lens reflex camera. The light from the photographic subject 2 passes through the photographic lens 1, and part of the light that has passed through the photographic lens now passes through the main mirror 3 within the camera main body, to reach the sub mirror 4. The light that is reflected downwards by the sub mirror 4 is then led to an autofocus module (hereafter referred to as the AF module) 5. The AF module 5 comprises an image reformation optical system, a CCD image sensor and a sensor drive circuit 6 which performs start/stop control of the sensor. The CCD image sensor receives the light that has entered and performs a charge accumulation operation which is of the known art, and then outputs a focal point detection signal (electrical signal) which indicates the focal point adjustment state of the photographic lens 1. This focal point detection signal is A/D converted at the CPU 7 and stored in memory in the CPU 7.

The lens data memory circuit 8 which is provided within the photographic lens, the motor control circuit 9 for the focusing motor 10, and the encoder 11 that detects the focusing position of the photographic lens are connected to the CPU 7. In the lens data memory circuit 8, the data which are inherent to the photographic lens 1, including the focal length of the photographic lens 1 and the conversion factor for converting the defocusing quantity to a lens drive quantity, are stored. The encoder 11 outputs pulse signals, the number of which corresponds to the distance that the focusing optical system of the photographic lens 1 traveled.

The CPU 7 calculates the defocusing quantity based upon the focal point detection signal that is stored in memory. The defocusing quantity is equivalent to the quantity of offset that is present in the direction of the optical axis between the image field on which the transmitted light of the photographic lens 1 actually forms an image and the predicted image field(a field equivalent to the film surface, for example). Moreover, the CPU 7 calculates the lens drive quantity based upon this defocusing quantity and the aforementioned conversion factor stored in the lens data memory circuit 8. Then, based upon this lens drive quantity, it controls the lens drive motor 10 via the motor control circuit 9. The drive force of the motor 10 is communicated to the focusing optical system of the photographic lens 1 via the lens drive mechanism 12 and focusing is thus performed.

In addition, the operating device 13 comprising a plurality of switches, and the exposure control circuit 14 are connected to the CPU 7. The operating device 13 includes a first-position switch that is turned ON by pressing the release button halfway down and a second-position switch that is turned ON by pressing the release button all the way down. The CPU 7, via the exposure control circuit 14, withdraws the main mirror 3 and the sub mirror 4 from the photographic subject light path when the second-position switch SW2 is set to ON and, at the same time, operates the shutter 15 to perform exposure.

The operation of this embodiment is explained in reference to FIGS. 2–19.

<<Main operation>>

Figure 2:
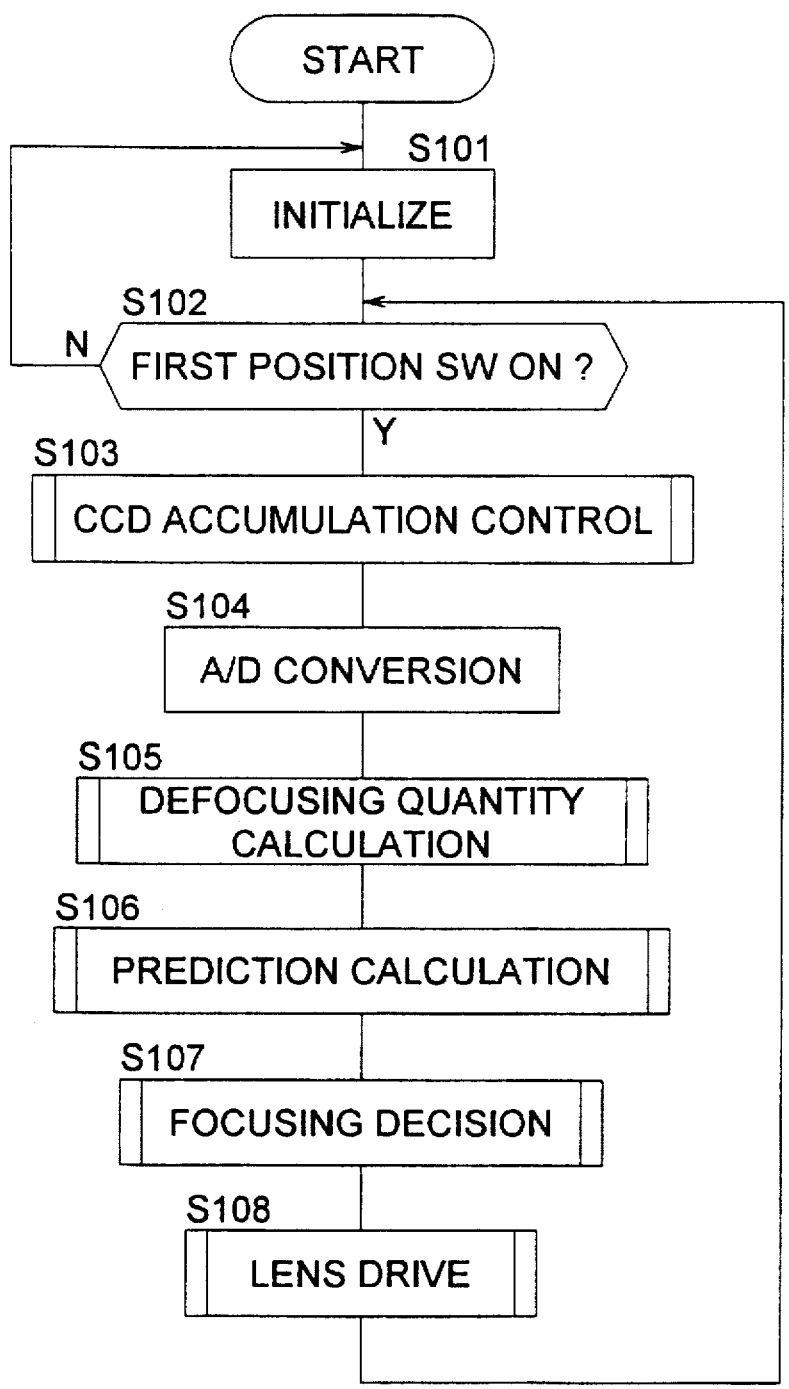
FIG. 2 is a flow-chart illustrating the main operation of the first embodiment.

FIG. 2 is a flow chart which illustrates the main control processing performed by the CPU 7. In step S101, data and flags within the memory which are used in the processing, to be explained later, are initialized. These data include the defocusing quantity detected in the past, the accumulation center time, the moving object flag and the focusing flag. In step S102, a decision is made as to whether or not the first-position switch is ON and if it is not ON, the operation returns to step S101. If it is ON, the operation proceeds to step S103 in which the CCD accumulation control subroutine is executed.

In step S104, the focal point detection signal that has been accumulated in the CCD is transferred to the CPU 7. This focal point detection signal is converted to a digital value by an A/D converter which is internally provided in the CPU7, and then it is stored in memory within the CPU 7. In step S105, the defocusing quantity calculation subroutine which calculates the defocusing quantity of the photographic lens 1 based upon the signal stored in memory, is executed. In step S106, the prediction calculation subroutine, which calculates the predicted defocusing quantity after a specific length of time has elapsed, and the predicted photographic subject moving speed at that time, is executed. In step S107, the focusing decision subroutine is executed and in step S108, the lens drive subroutine is executed. After this, the processing returns to step S102.

The following is a detailed explanation of the various subroutines referred to above.

<<CCD Accumulation Control Subroutine>>

Figure 3:
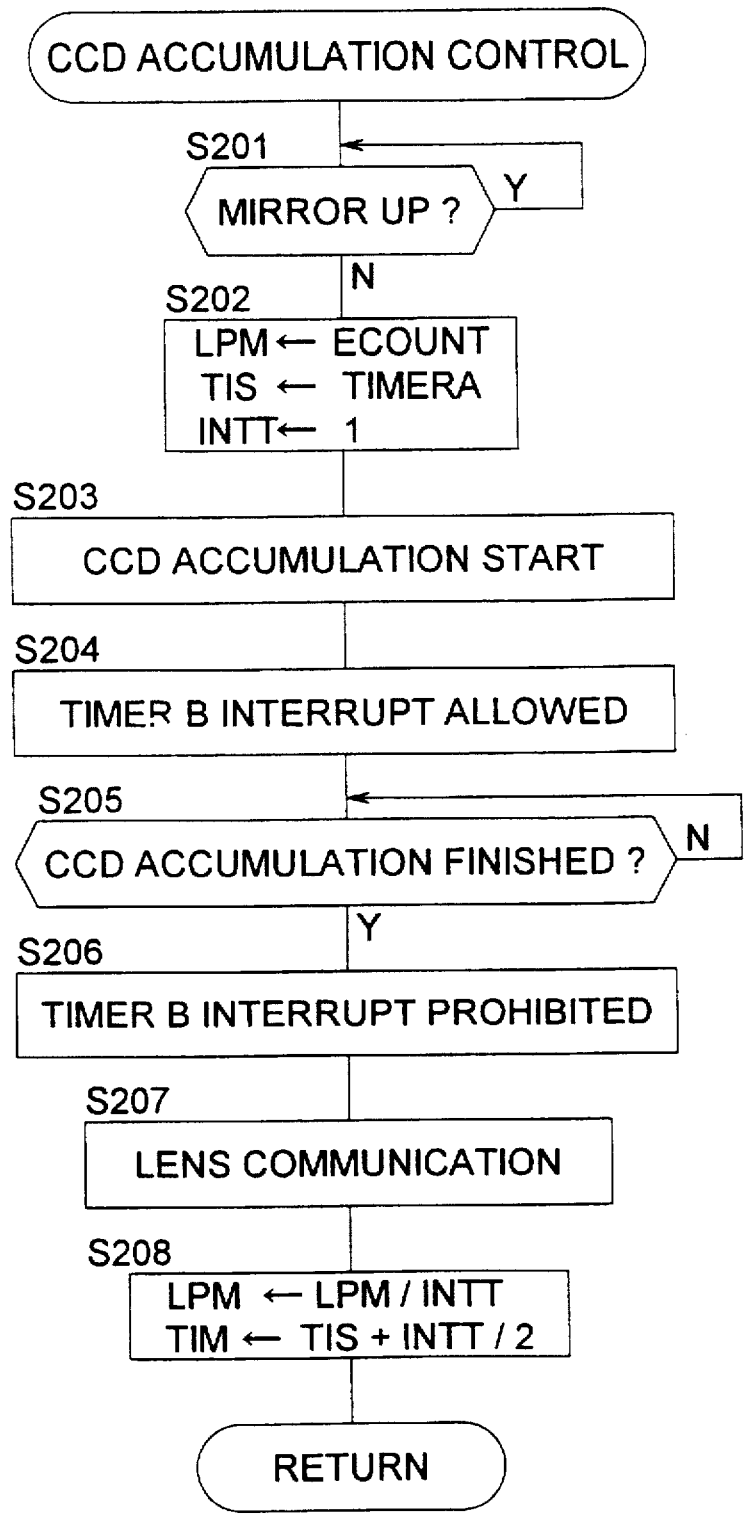
FIG. 3 is a flow chart illustrating the accumulation control subroutine.
Figure 4:
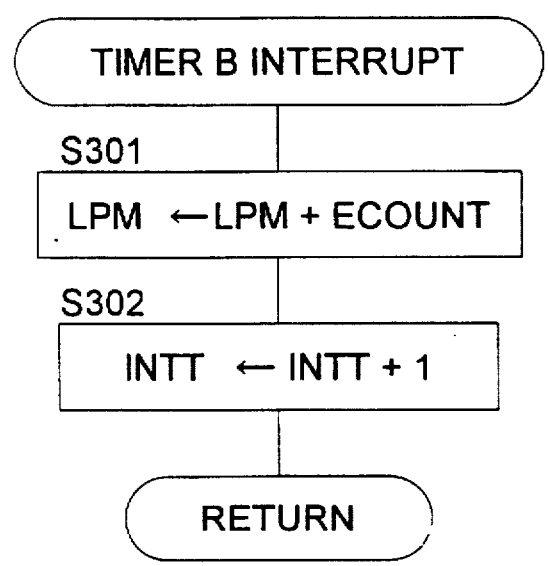
FIG. 4 is a flow chart illustrating the timer interrupt subroutine.

FIGS. 3 and 4 show details of the CCD accumulation control subroutine which is executed in step S103 described above. In step S201, a decision is made as to whether or not the mirrors 3, 4 are currently raised, i.e., are withdrawn from the photographic subject light path. If they are raised, focal point detection cannot be performed, as the photographic subject light is not induced to the AF module 5. Thus, the CPU 7 waits for the mirrors 3, 4 to go down. In step S202, the current count value ECOUNT on the counter that counts pulses from the encoder 11 is stored in the variable parameter LPN. And counted time on the free-running timer A, i.e., the current time TIMERA, is stored in the parameter TIS and "1" is stored in the variable parameter INTT which is for counting the accumulation time.

In step S203, the charge accumulation operation of the CCD image sensor which is a component of the AF module 5, starts. In step S204, an interrupt of the free-running timer B is allowed. While this interrupt is allowed, the interrupt processing, which is to be detailed later, is executed cyclically at intervals of, for example, 1 ms. This interrupt processing is performed to monitor the lens position during the accumulation operation. In step S205, a decision is made as to whether or not the accumulation operation has been completed. Whether or not the accumulation has been completed can be decided by, for example, determining whether or not the count value on the free-running timer B has reached a specific value.

When it is decided that accumulation has been completed in step S205, the operation proceeds to step S206, in which the interrupt of the free-running timer B is prohibited. Communication with the photographic lens side is performed in step S207, and the lens data are acquired from the lens data memory circuit 8, as explained earlier, the lens data include the conversion factor for converting the defocusing quantity to lens drive quantity, the focal length of the photographic lens and the opening aperture value. In step S208, the accumulation center time TIM and the average lens position LPM during accumulation are calculated using the following formulae, based upon the time TIS which was set in step S202, and the accumulation-time INTT, which is counted in the interrupt processing shown in FIG. 4.

TIM←TIS+INTT/2
LPM←LPM/INTT

<<Timer Interrupt Subroutine>>

FIG. 4 shows details of the interrupt processing of the free-running timer B which is executed between steps S204–S206 (FIG. 3). When an interrupt occurs of the free-running timer B, this subroutine is executed. In step S301, the current count value ECOUNT on the counter which counts the pulses sent from the encoder 11 is added to the average lens position LPM. In step S302, the accumulation time INTT is incremented to count the accumulation time.

<<Defocusing Quantity Calculation Subroutine>>

Figure 5:
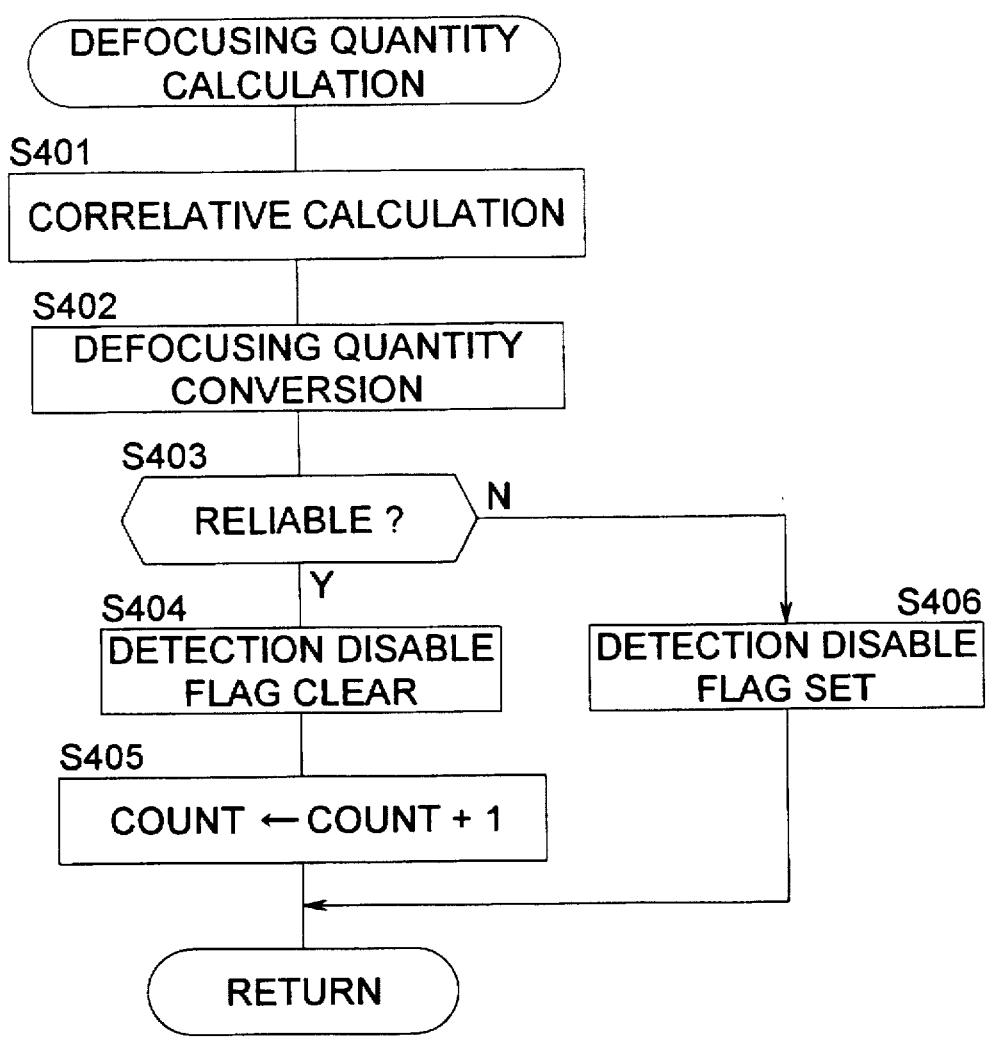
FIG. 5 is a flow chart illustrating the defocusing quantity calculation subroutine.

FIG. 5 shows details of the defocusing quantity calculation subroutine performed in step S105 (FIG. 2).

In FIG. 5, a correlative calculation of the known art is performed in step S401, in order to accumulate the image offset quantity on the CCD image sensor based upon the focal point detection signal. In step S402, the image offset quantity that was calculated in step S401 is converted to a defocusing quantity. In step S403, the reliability of the defocusing quantity that was calculated in step S402 is determined. If this reliability is equal to or more than a specific value, the operation proceeds to step S404, in which the detection disable flag, which indicates that focal point detection is disabled, is cleared. In step S405, the value of the variable parameter COUNT, which indicates the number of data that can be used for prediction calculation, is incremented. Now, if the reliability described above is less than the specific value, the detection disable flag is set in step S406. After steps S405 and S406, the operation returns to the processing shown in FIG. 2.

<<Prediction Calculation Subroutine>>

Figure 6:
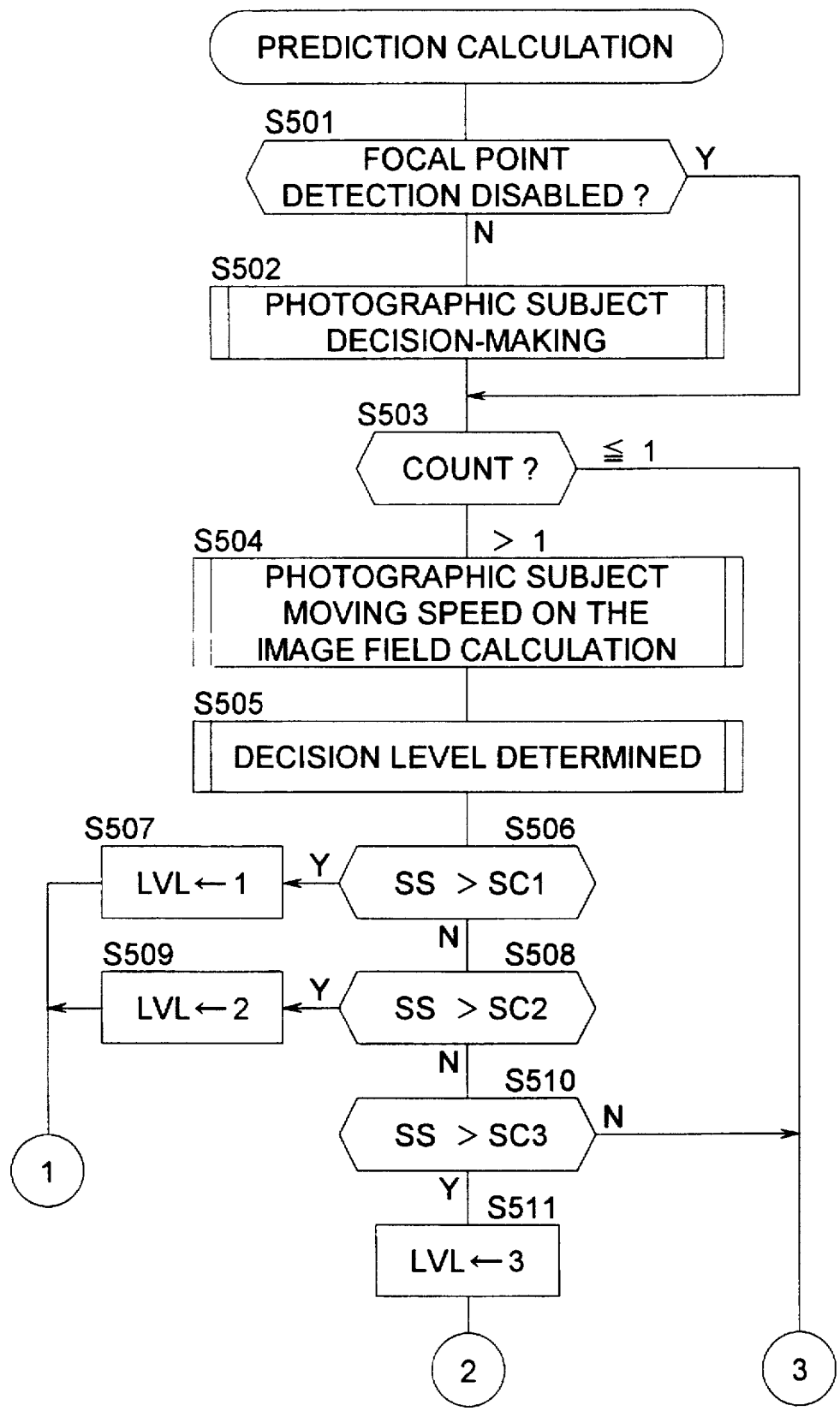
FIGS. 6 and 7 are a flow chart illustrating the prediction calculation subroutine.
Figure 7:
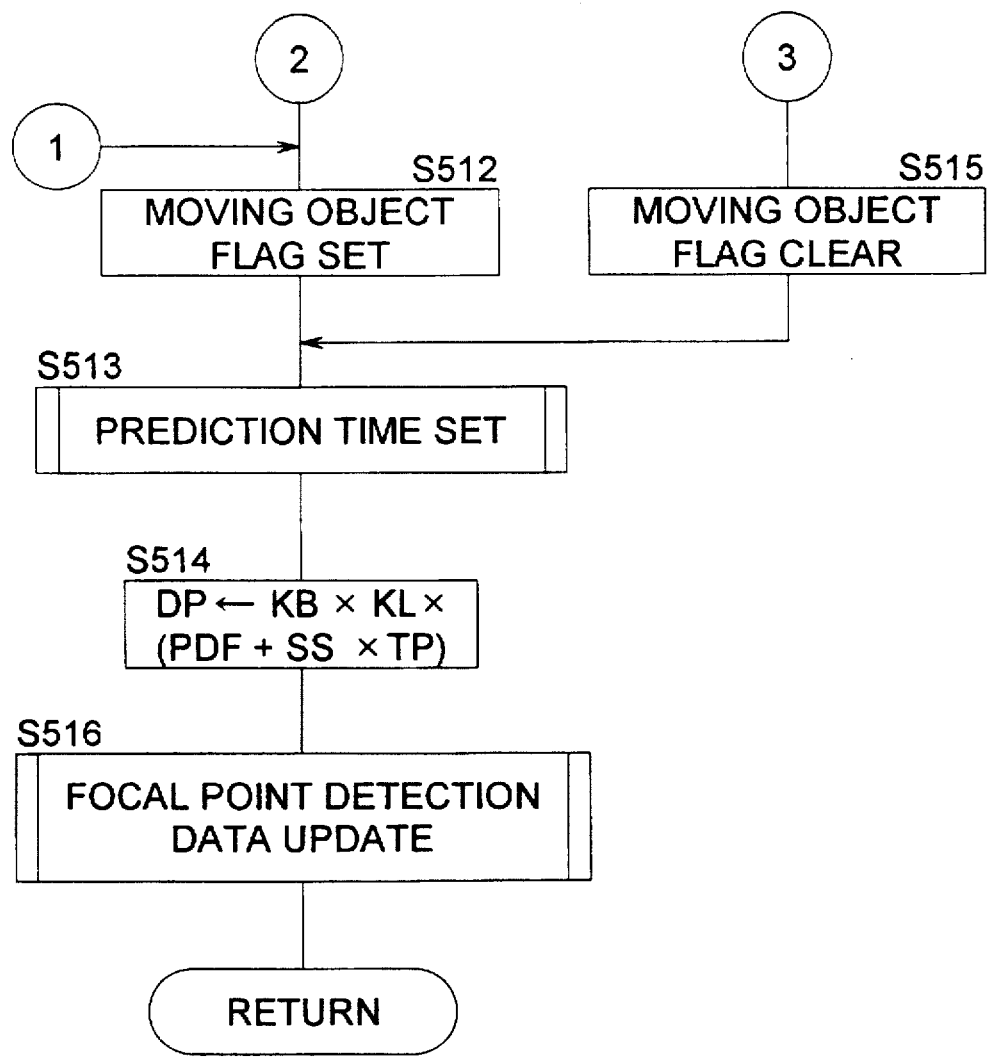

FIGS. 6 and 7 are a flow chart which shows details of the prediction calculation subroutine executed in step S106 (FIG. 2).

First, in step S501, shown in FIG. 6, a decision is made as to whether or not the focal point detection in the most recent accumulation operation by the CCD image sensor was disabled, based upon the state of the aforementioned detection disabled flag. If the detection was disabled, the operation skips step S502 and proceeds to step S503. If the detection was not disabled, the operation proceeds to the photographic subject decision-making subroutine, performed in step S502.

Figure 8:
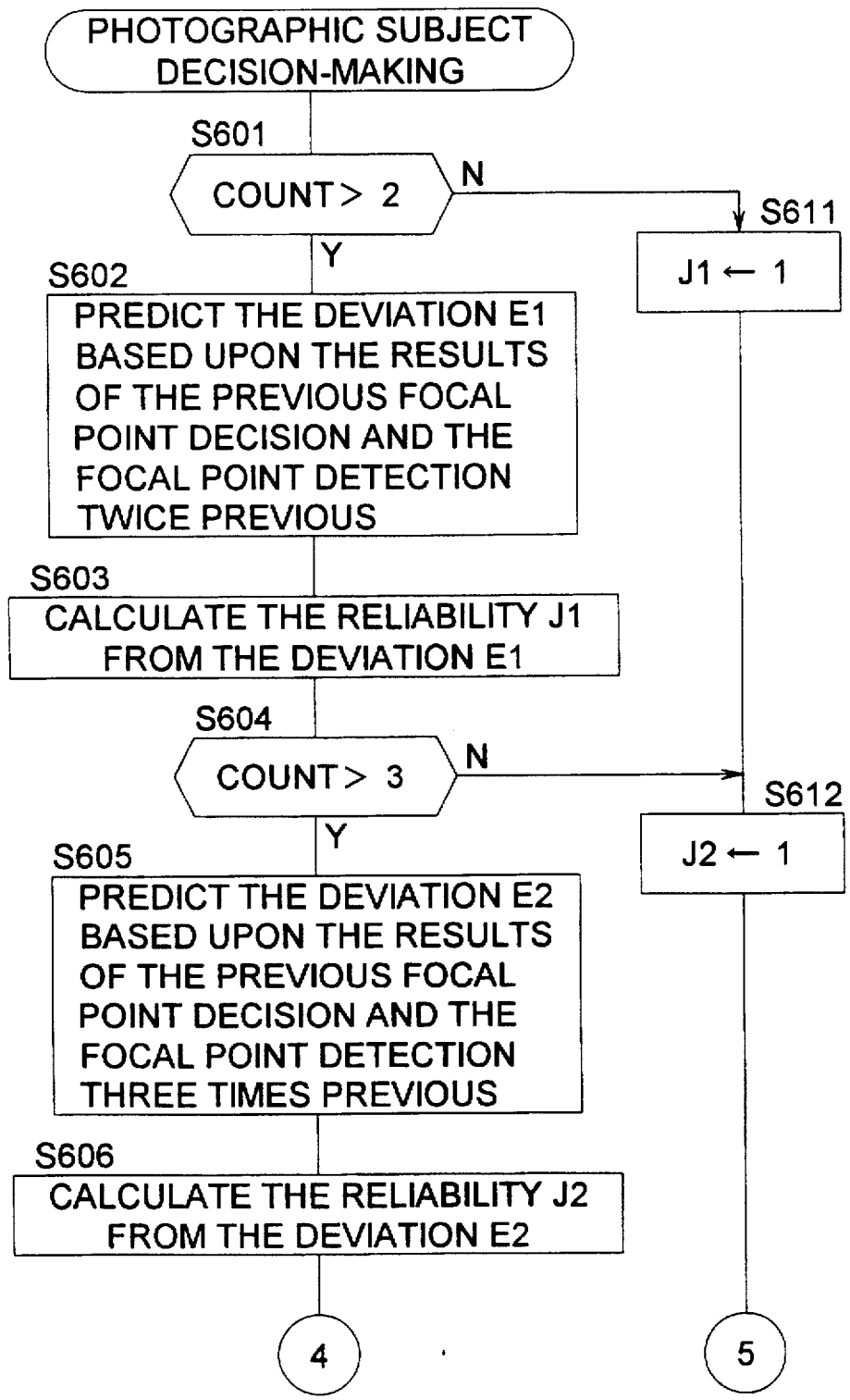
FIGS. 8 and 9 are a flow chart illustrating the photographic subject decision-making subroutine.
Figure 9:
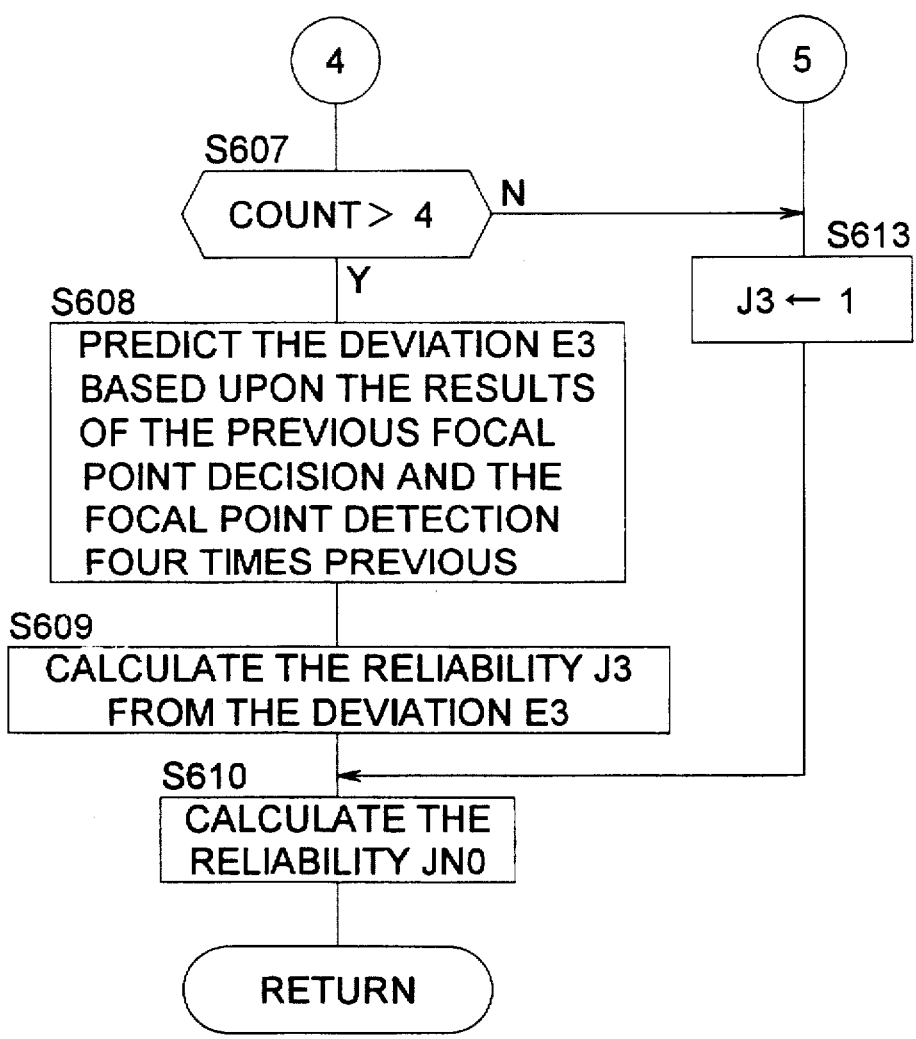

(1) Photographic subject decision-making subroutine:

In the photographic subject decision-making subroutine, identical photographic subject reliability, which indicates the degree of correspondence of the photographic subject for which focal point detection was performed in the most recent accumulation operation, and the photographic subject for which focal point detection was performed in a accumulation operation in the past is calculated and its details are shown in FIGS. 8 and 9.

In step S601, shown in FIG. 8, a decision is made as to whether or not the number of data COUNT which can be used for prediction calculation, is larger than 2. If an affirmative decision is made, the operation proceeds to step S602, in which the predicted position (the position on the image field) of the photographic subject at the time of the most recent focal point detection is calculated based upon the results of the focal point detections which were performed in the immediately previous operation and the one before that, and the deviation between this predicted position and the position of the photographic subject that is obtained from the results of the most recent focal point detection is calculated. Its details are explained in reference to FIG. 10.

Figure 10:
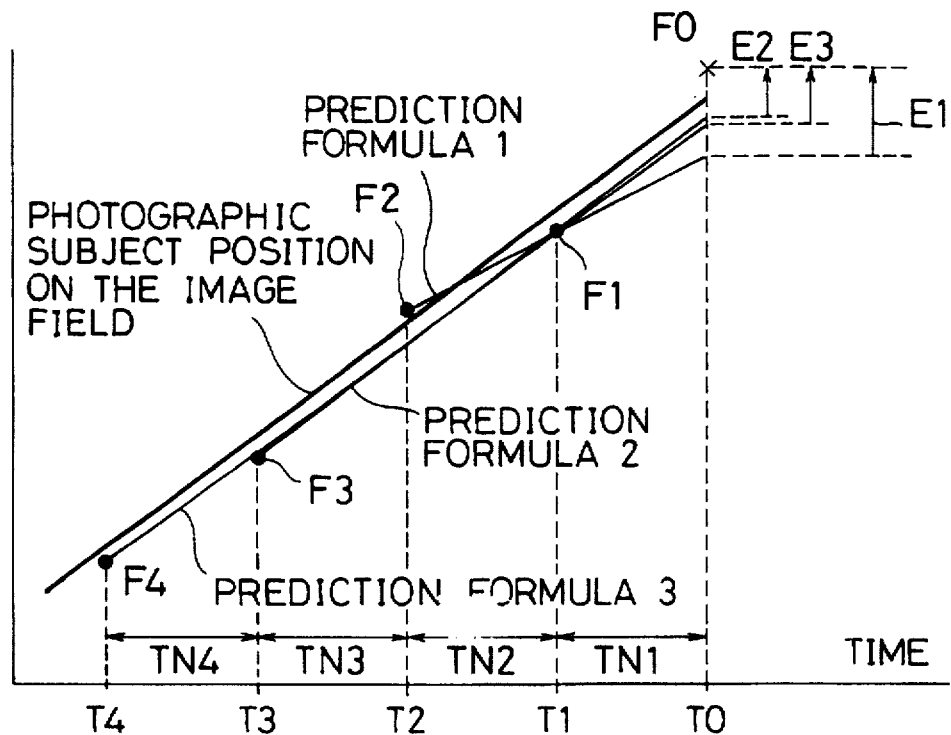
FIG. 10 is a graph illustrating the principle of photographic subject decision-making.

In FIG. 10, T0 indicates the time at which the most recent focal point detection was performed in the accumulation operation of the CCD image sensor and T1–T4 indicate times at which focal point detections were performed in the past. F0–F4 indicate the corresponding photographic subject positions obtained through focal point detections performed at times T0–T4. These values can be determined from the defocusing quantities and the count values ECOUNT of the encoder pulses at the various times. In step S602, the photographic subject predicted position at the most recent focal point detection time T0 is calculated using a linear expression approximation (prediction formula 1) based upon the photographic subject positions F1 and F2 from the immediately previous focal point detection and the one before that, and then the deviation E1 between the predicted position and the actual photographic subject position F0 is calculated. In other words, the deviation E1 is calculated using the following formula:

$$E1 = \frac{(F1 - F2) \times (T0 - T1)}{T1 - T2} + F1 - F0$$

Figure 11:
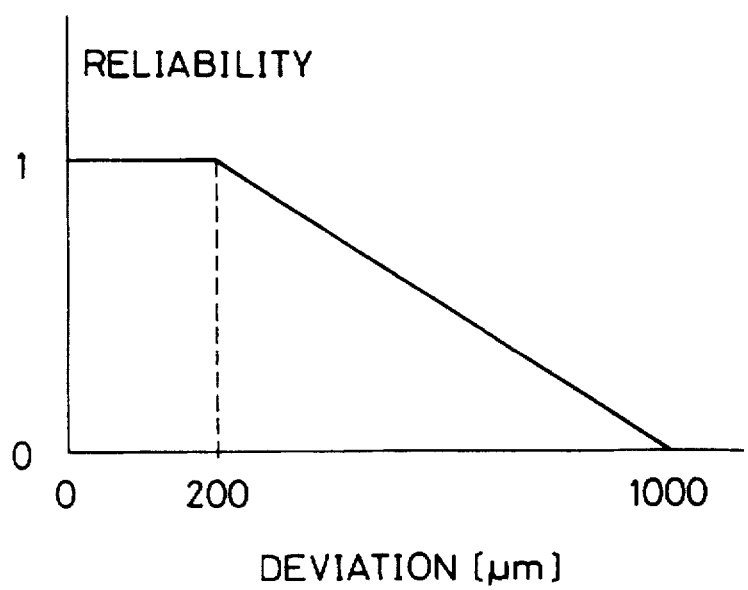
FIG. 11 is a characteristics graph illustrating identical photographic subject reliability.

In step S603, the identical photographic subject reliability J1, which indicates the degree of correspondence between the photographic subject for which focal point detection was performed in the most recent accumulation operation and the photographic subject for which focal point detection was performed in a past accumulation operation is calculated using the characteristics shown in FIG. 11, based upon the deviation E1 described above. In this embodiment, the reliability J1 is expressed with a real value from 0–1 and when the absolute value of the deviation E1 is equal to or less than 200 µm, then J1=1. When the absolute value of the deviation E1 is equal to or more than 1 mm, J1=0. When the absolute value of the deviation E1 is within the range of 200 µm–1 mm, J1 changes linearly between "0" and "1." In summary, when the actual photographic subject position deviates greatly from the predicted photographic subject position, the identical photographic subject reliability becomes lower. On the other hand, if a negative decision is made in step S601, the operation proceeds to step S611 in which "1" is set for J1, after which, the operation proceeds to step S612.

In step S604, a decision is made as to whether or not the number of data COUNT that can be used for prediction calculation is larger than 3. If an affirmative decision is made, the operation proceeds to step S605. In step S605, the photographic subject predicted position at the most recent focal point detection time is calculated using a linear expression approximation (prediction formula 2) based upon the immediately previous focal point detection results and the results of the one three times previous. And the deviation E2 between the predicted position which is calculated and the photographic subject position obtained from the results of the most recent focal point detection is calculated using the following formula:

$$E2 = \frac{(F1 - F3) \times (T0 - T1)}{T1 - T3} + F1 - F0$$

In step S606, the identical photographic subject reliability J2, which indicates the degree of correspondence between the photographic subject for which focal point detection was performed in the most recent accumulation operation and the photographic subject for which focal point detection was performed in a past accumulation operation, is calculated using similar characteristics to those shown in FIG. 11 based upon the deviation E2. If a negative decision is made in step S604, the operation proceeds to S612, in which "1" is set for J2 and the operation proceeds to step S613.

In step S607, a decision is made as to whether or the number of data COUNT which can be used for prediction calculation is larger than 4 and if an affirmative decision is made, the operation proceeds to step S608. In step S608, the photographic subject predicted position at the most recent focal point detection time is calculated using a linear expression approximation (prediction formula 3) based upon the results of the immediately previous focal point detection and the results of the one four times previous. And the deviation E3 between the calculated predicted position and the photographic subject position obtained from the results of the most recent focal point detection is calculated using the following formula:

$$E3 = \frac{(F1 - F4) \times (T0 - T1)}{T1 - T4} + F1 - F0$$

In step S609, the identical photographic subject reliability J3, which indicates the degree of correspondence between the photographic subject for which focal point detection was performed in the most recent accumulation operation and the photographic subject for which focal point detection was performed in a past accumulation operation, is calculated using similar characteristics to those shown in FIG. 11 based upon the deviation E3. On the other hand, if a negative decision is made in step S607, the operation proceeds to S613, in which "1" is set for J3 and the operation proceeds to step S610.

In step S610, the reliability value JN0, which indicates whether or not the photographic subject for which focal point detection was performed in the most recent focal point detection is the same as the photographic subjects for which focal point detection was performed in the past is calculated using the following formula based upon the reliability values J1, J2 and J3.

$$JN0=(J1+J2+J3)/3$$

After this, the operation returns to the processing shown in FIG. 6. The numerical values for reliability are not limited to those used in the graph in FIG. 11.

(2) Photographic subject moving speed calculation subroutine:

In step 503, in FIG. 6, a decision is made as to whether or not the number of data COUNT used for prediction calculation is equal to or larger than 2. If it is, the operation proceeds to the photographic subject moving speed calculation subroutine, which is performed in step S504. The details of this photographic subject moving speed calculation subroutine are shown in FIG. 12.

Figure 12:
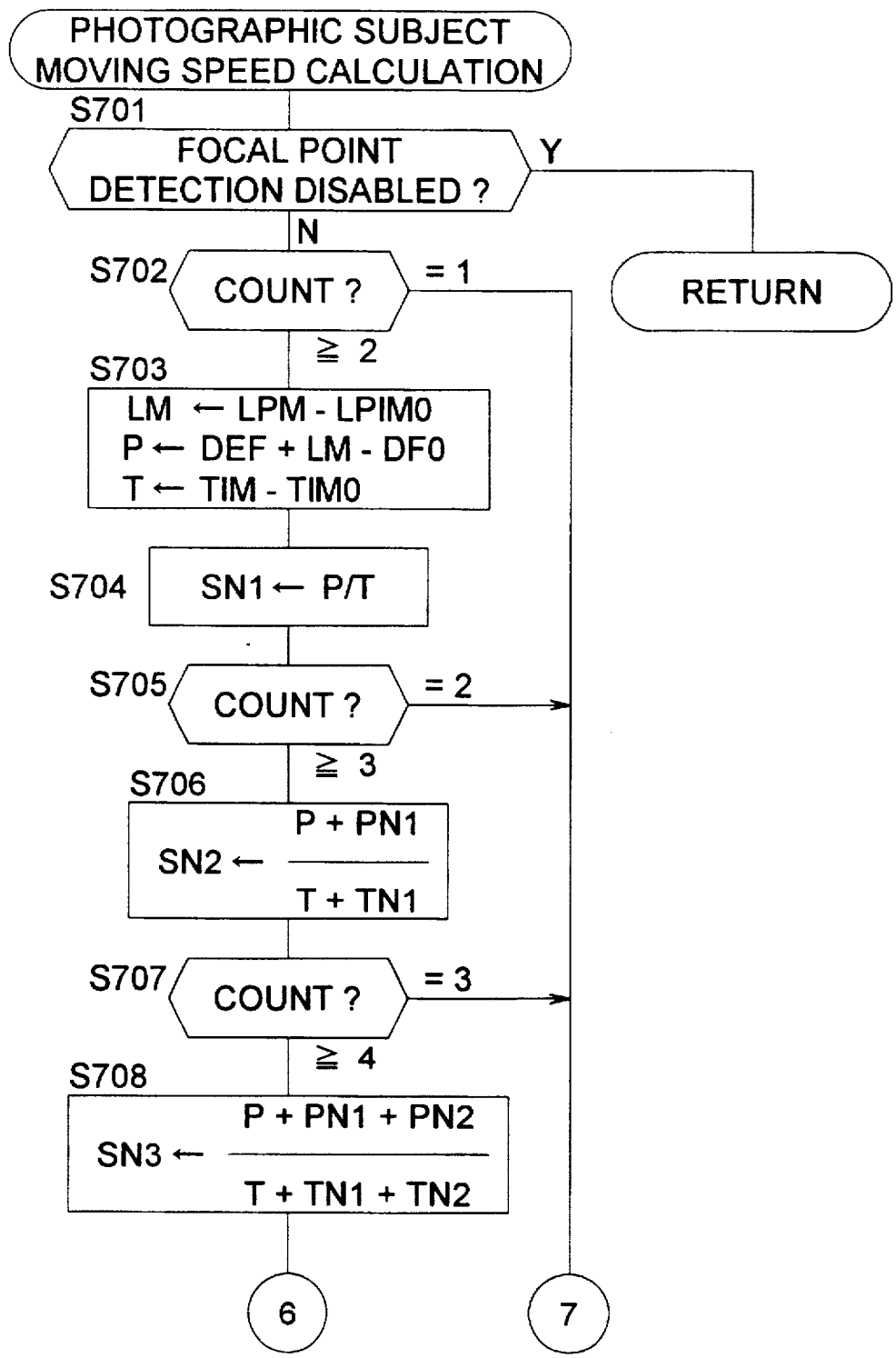
FIGS. 12 and 13 are a flow chart illustrating the photographic subject moving speed calculation subroutine.
Figure 13:
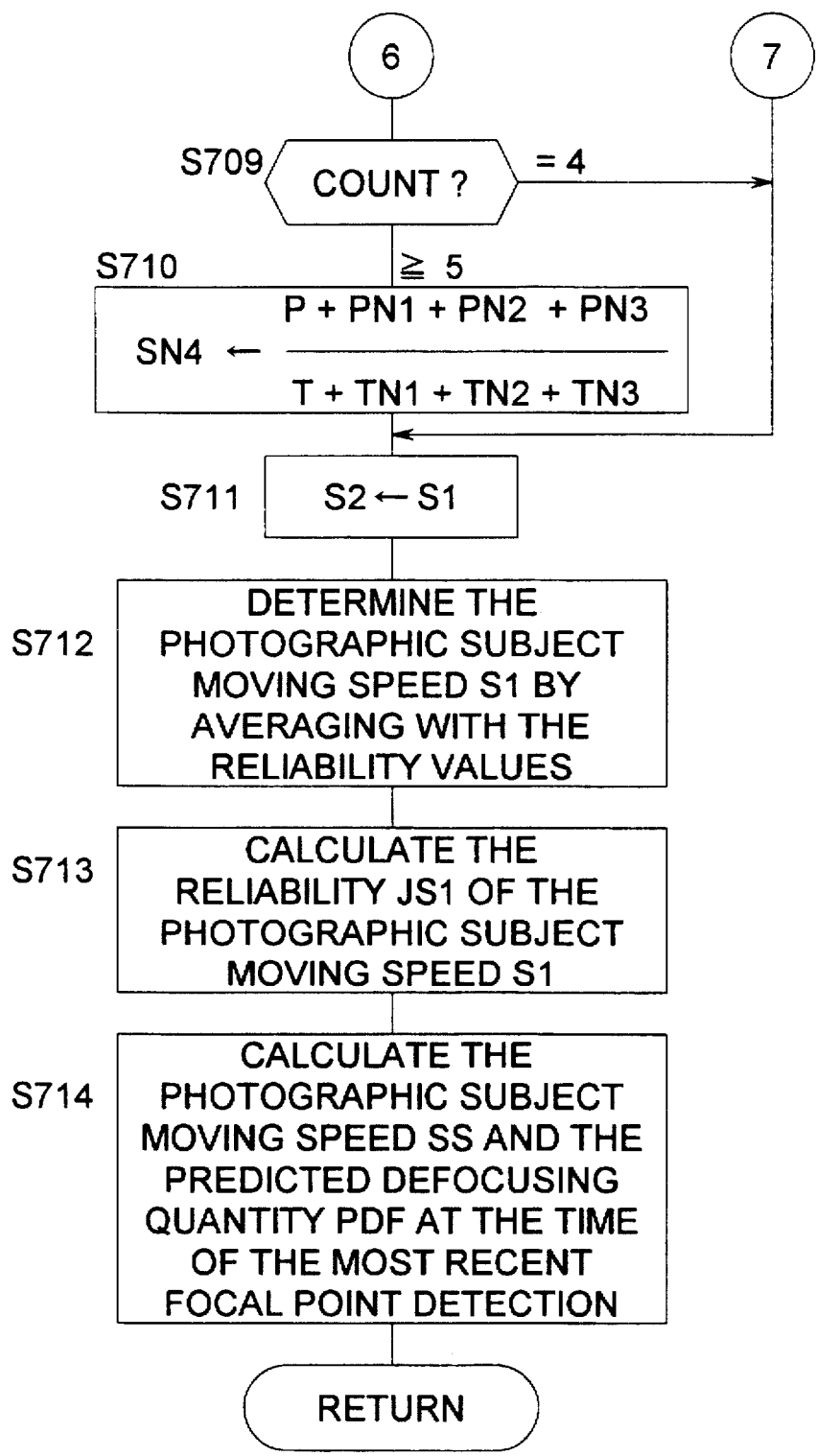

In FIG. 12, in step S701, a decision is made from the state of the detection disable flag as to whether or not focal point detection is disabled, and if focal point detection is disabled, the photographic subject moving speed on the image field is not calculated and the operation returns. If focal point detection is possible, the operation proceeds to step S702, in which the number of data COUNT used for prediction calculation is equal to or larger than 2. If an affirmative decision is made, the operation proceeds to step S703 and if the decision is negative, the operation moves on to step S711. In step S703, the lens travel quantity LM that is the distance the lens moved from the time when the previous focal point detection is performed to the time when the most recent focal point detection is performed, the photographic subject movement quantity P which indicates the movement quantity of the photographic subject on the image field, and the time interval T between the two focal point detections are calculated using the following formulae:

LM←LPM−LPIM0

P←DEF+LM−DF0

T←TIM−TIM0

Here, LPM indicates the lens position at the most recent accumulation center time, LPIM0 indicates the lens position at the immediately previous accumulation center time, DEF indicates the most recent defocusing quantity, DF0 indicates the immediately previous defocusing quantity, TIM indicates the most recent accumulation center time and TIM0 indicates the immediately previous accumulation center time.

In step S704, the photographic subject moving speed SN1 which indicates the moving speed of the photographic subject on the image field, the span of which is "1," is calculated using the following formula, based upon the most recent focal point detection results and the results of the immediately previous focal point detection.

SN1←P/T

In step S705, a decision is made as to whether or not the COUNT is equal to or larger than 3 and if it is, the operation proceeds to step S706. If not, the operation moves on to step S711. In step S706, the photographic subject moving speed SN2, the span of which is "2", is calculated using the following formula:

$$SN2 \leftarrow \frac{P + PN1}{T + TN1}$$

In the formula above, TN1 is the time interval between the most recent focal point detection time and the immediately previous focal point detection time and PN1 indicates the photographic subject movement quantity while the time TN1 elapses, as shown in FIG. 10.

In step S707, a decision is made as to whether or not the COUNT is equal to or larger than 4, and if it is, the operation proceeds to step S708. If not, the operation moves on to step S711. In step S708, the photographic subject moving speed SN3, the span of which is "3," is calculated using the following formula:

$$SN3 \leftarrow \frac{P + PN1 + PN2}{T + TN1 + TN2}$$

In the formula above, TN2 is the time interval between the immediately previous focal point detection time and the one before that. PN2 indicates the photographic subject movement quantity while the time TN2 elapses.

In step S709, a decision is made as to whether or not the COUNT is equal to or larger than 5, and if it is, the operation proceeds to step S710. If not, the operation moves on to step S711. In step S710, the photographic subject moving speed SN4, the span of which is "4," is calculated using the following formula:

$$SN4 \leftarrow \frac{P + PN1 + PN2 + PN3}{T + TN1 + TN2 + TN3}$$

In the formula above, TN3 is the time interval between the twice previous focal point detection time and the one before that. PN3 indicates the photographic subject movement quantity while the time TN3 elapses.

In step S711, the photographic subject moving speed S1 which was previously calculated is stored in S2. In step S712, the photographic subject moving speed S1 is calculated using the following formula:

$$S1 = \frac{JN1 \times SN1 + JN2 \times SN2 + JN3 \times SN3 + JN4 \times SN4}{JN1 + JN2 + JN3 + JN4}$$

In the formula above, JN1–JN4 are the corresponding degrees of reliability calculated in step S610, as described above, at times T1–T4 (FIG. 10) respectively.

In step S713, the reliability JS1 of the photographic subject moving speed S1 is calculated using the following formula:

$$JS1 \leftarrow JN0 \times (JN1 + JN2 + JN3 + JN4)/4$$

According to this formula, if the photographic subject for which the most recent focal point detection was performed is different from the photographic subject for which the past focal point detection was performed, the reliability of the photographic subject moving speed S1 is low.

In step S714, a predicted defocusing quantity PDF and a predicted photographic subject moving speed SS at the time of the most recent focal point detection are calculated using the following formulae based upon the photographic subject moving speed S2 which was previously calculated and the most recent photographic subject moving speed S1.

$$PDF \leftarrow \frac{DEF \times JN0 + JS2 \times (S2 \times T - P + DEF)}{JN0 + JS2}$$

$$SS \leftarrow \frac{JS1 \times S1 + JS2 \times S2}{JS1 + JS2}$$

When step S714 is completed, the operation returns to the processing shown in FIG. 6, and, as will be explained later, lens drive is performed based upon the predicted photographic subject moving speed SS and the predicted defocusing quantity PDF which are calculated as described above.

As is clear from the above explanation, in this embodiment, the identical photographic subject reliability is calculated based upon the most recent focal point detection results (focal point adjustment state) and the past focal point detection results (focal point adjustment state). If this identical photographic subject reliability is low, the weight of the most recent photographic subject moving speed S1 becomes reduced in the calculation of the photographic subject moving speed SS and, at the same time, the weight of the defocusing quantity DEF, determined by the most recent focus detection is reduced in the calculation of defocusing quantity PDF. In particular, if the identical photographic subject reliability is "0," the most recent photographic subject moving speed S1 is totally disregarded in the calculation of the photographic subject moving speed SS and, at the same time, the defocusing quantity DEF determined by the most recent focal detection is totally disregarded in the calculation of the defocusing quantity PDF. With this, if the intended photographic subject goes out of the specific focal point detection area in the subject field momentarily, for example, or if an object crosses in front of the intended photographic subject, blocking the intended photographic subject, no irrelevant photographic subject moving speed SS or defocusing quantity PDF is calculated through erroneously recognizing them as the same photographic subject. Also, in such cases as described above, photographic subject position prediction and lens drive for the intended photographic subject will not be prohibited immediately, and therefore, photographic subject position prediction and lens drive will not be implemented for the new photographic subject. This means hunting of the photographic lens can be prevented, since photographic subjects for which photographic subject position prediction and lens drive are performed, do not change frequently.

(3) Decision level determining subroutine:

In step S505, in FIG. 6, the decision level determining subroutine is executed. In this processing, the decision level for the photographic subject moving speed used in the moving object decision processing, to be explained later, are determined according to the defocusing quantity.

Figure 14:
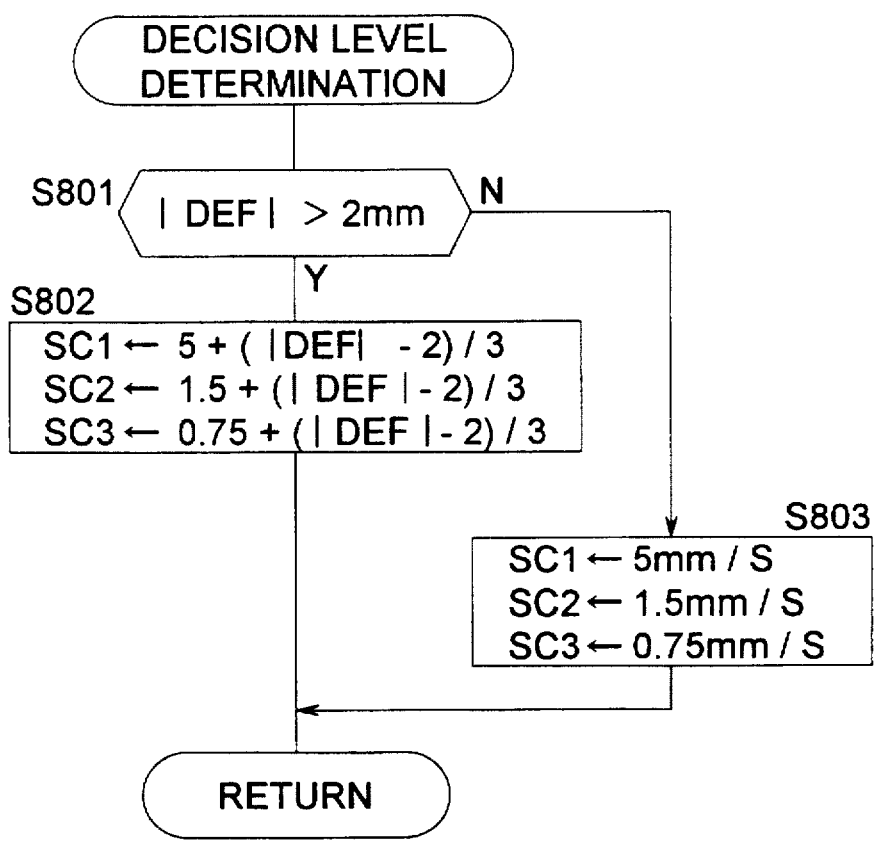
FIG. 14 is a flow chart illustrating the decision level determining subroutine.

Details of the decision level determining subroutine are shown in FIG. 14. In step S801, in FIG. 14, a decision is made as to whether or not the most recent defocusing quantity DEF exceeds 2 mm and if an affirmative decision is made, the operation proceeds to step S802, in which the moving object decision level SC1, SC2 and SC3 (mm/S) are calculated using the following formulae:

$$SC1 \leftarrow 5 + (|DEF| - 2)/3$$

$$SC2 \leftarrow 1.5 + (|DEF| - 2)/3$$

$$SC3 \leftarrow 0.75 + (|DEF| - 2)/3$$

If a negative decision is made in step S802, i.e., if the most recent defocusing quantity DEF is equal to or less than 2 mm, the operation proceeds to step S803, in which the specific decision level SC1, SC2 and SC3 (mm/S), which are not relative to the defocusing quantity, are set. That is:

SC1←5

SC2←1.5

SC3←0.75

Then the operation returns to the processing shown in FIG. 6.

In the processing described above, if the defocusing quantity exceeds 2 mm, the decision level SC1–SC3 increase in proportion to the defocusing quantity. The reason for changing the decision level in correspondence with the defocusing quantity is explained later.

(4) Moving object decision:

In step S506, in FIG. 6, a decision is made as to whether or not the predicted photographic subject moving speed SS, obtained in the photographic subject moving speed calculation subroutine, is larger than the value SC1 determined in the decision level determining subroutine. If an affirmative decision is made in step S506, i.e., if the photographic subject moving speed on the image field is high, the operation proceeds to step S507 in which "1" is set for the moving object level LVL. In step S508, a decision is made as to whether or not the predicted photographic subject moving speed SS is larger than SC2. If an affirmative decision is made, i.e., if the photographic subject moving speed on the image field is medium, then "2" is set for the moving object level LVL in step S509.

In step S510, a decision is made as to whether or not the predicted photographic subject moving speed SS is larger than SC3. If an affirmative decision is made, i.e., the photographic subject moving speed of the photographic subject is low, the operation proceeds to step S511, in which "3" is set for the moving object level LVL. After steps S507, S509 and S511, the operation proceeds to step S512, in which the moving object flag is set. In contrast, if a negative decision is made in step S510, i.e., if the photographic subject has moved very little, the moving object flag is cleared in step S515. Note that the moving object flag is also cleared in step S515 if the decision is made in step S503 that the COUNT is equal to or less than 1.

As has been explained, in this embodiment, the photographic subject moving speed SS and the moving object decision level SC1–SC3 are compared in order to determine the moving object level LVL of the photographic subject. In particular, if the photographic subject moving speed SS is equal to or less than the moving object decision level SC3, it is determined that the photographic subject is not a moving object. As mentioned earlier, if the defocusing quantity is larger than a specific value, the moving object decision level SC1–SC3 increase in proportion to the defocusing quantity. The significance of this is explained below.

Generally speaking, the defocusing quantity contains more error as its value increases, and thus, its reliability becomes lower. Since the photographic subject moving speed is calculated based upon this defocusing quantity, the larger the defocusing quantity, the lower the reliability of the calculated photographic subject moving speed. The calculated value of the photographic subject moving speed could be even higher than the actual photographic subject moving speed, for example. Consequently, when performing moving object decision for a photographic subject by comparing the calculated photographic subject moving speed against a specific level, if the defocusing quantity is large, an accurate decision cannot be made unless the moving object decision level is raised by anticipating an error in the calculated photographic subject moving speed. In an extreme case, a stationary photographic subject could be determined to be a moving object. On the other hand, if the defocusing quantity is small, the error contained in the defocusing quantity is small and therefore the photographic subject moving speed, which is calculated using the defocusing quantity, has a high degree of reliability. As a result, an accurate moving object decision can be made even with a normal movement decision level, i.e., when it is at a level lower than it would be when the defocusing quantity is large.

In this embodiment, the moving object decision level SC1–SC3 are determined according to the level of the defocusing quantity. And the moving object decision for a photographic subject is made by comparing the photographic subject moving speed SS against the moving object decision level SC1–SC3. As a result, an accurate moving object decision is made regardless of the defocusing quantity and a stationary object is never erroneously determined to be a moving object. Also, when the photographic subject speed is high, and, consequently, the defocusing quantity is large, the moving object is never erroneously determined to be a stationary object. Therefore, hunting of the photographic lens does not occur when the moving speed of the photographic subject frequently changes.

(5) Prediction time setting subroutine

Figure 15:
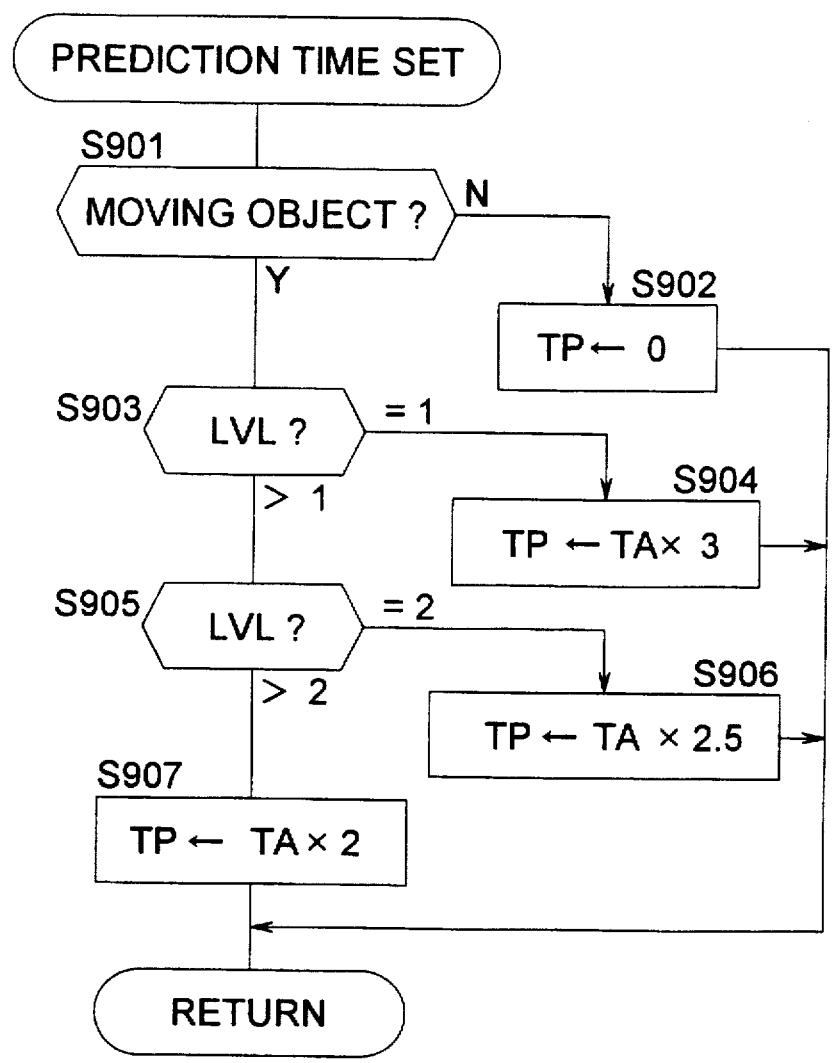
FIG. 15 is a flow chart illustrating the prediction time setting subroutine.

In step S513, the prediction time setting subroutine is executed and its details are shown in FIG. 15.

In FIG. 15, a decision is made as to whether or not a photographic subject is a moving object according to the state of the moving object flag in step S901. If the photographic subject is determined to be a moving object, the operation proceeds to step S903. If not, the operation proceeds to step S902, in which "0" is set for the prediction time TP. The prediction time is set to "0" when the number of the focal point detection data is insufficient and therefore, the photographic subject moving speed cannot be calculated, or when the photographic subject moving speed on the image field is lower than a specific value.

In step S903, a decision is made as to whether or not the moving object level LVL is set at "1." If it is, the operation proceeds to step S904. In step S904, since the photographic subject moving speed is high, the prediction time TP is set at 3 times that of the standard prediction time TA. In step S905, a decision is made as to whether or not the moving object level LVL is set at "2." If it is, the operation proceeds to step S906. In step S906, since the photographic subject moving speed is medium, the prediction time TP is set at 2.5 times that of the standard prediction time TA. If it is determined in step S905 that the moving object level LVL is not set at "2," i.e., if it is set at "3," the operation proceeds to step S907. In step S907, since the photographic subject moving speed is low, the prediction time TP is set at 2 times that of the standard prediction time TA. Then the operation returns to the processing shown in FIG. 6.

As has been explained, in this embodiment, the higher the photographic subject moving speed, the longer the prediction time TP.

(6) Lens drive quantity calculation:

In step S514, in FIG. 6, the lens drive quantity DP is calculated using the following formula based upon the lens position PDF at the accumulation center time, the photographic subject moving speed SS and the prediction time TP, which have been calculated as described above.

$$DP \leftarrow KB \times KL \times (PDF + SS \times TP)$$

In the formula above, KB is a conversion factor inherent to the camera body and KL is a conversion factor inherent to the photographic lens. This lens drive quantity DP is used for focusing the photographic lens on the photographic subject after the prediction time TP has elapsed, and the calculation of this lens drive quantity is equivalent to the prediction of the photographic subject position.

As has also been explained, in this embodiment, when the photographic subject moving speed of the photographic subject is high, the photographic subject position prediction time TP is long. As a result, the problem of the lens movement being unable to keep up with the movement of the photographic subject and of focusing being, therefore, unattainable, is prevented. If, on the other hand, the photographic subject moving speed of the photographic subject is low, the photographic subject position prediction time TP is short. As a result, hunting of the photographic lens does not occur, even when the error contained in the photographic subject moving speed is large.

Figure 16:
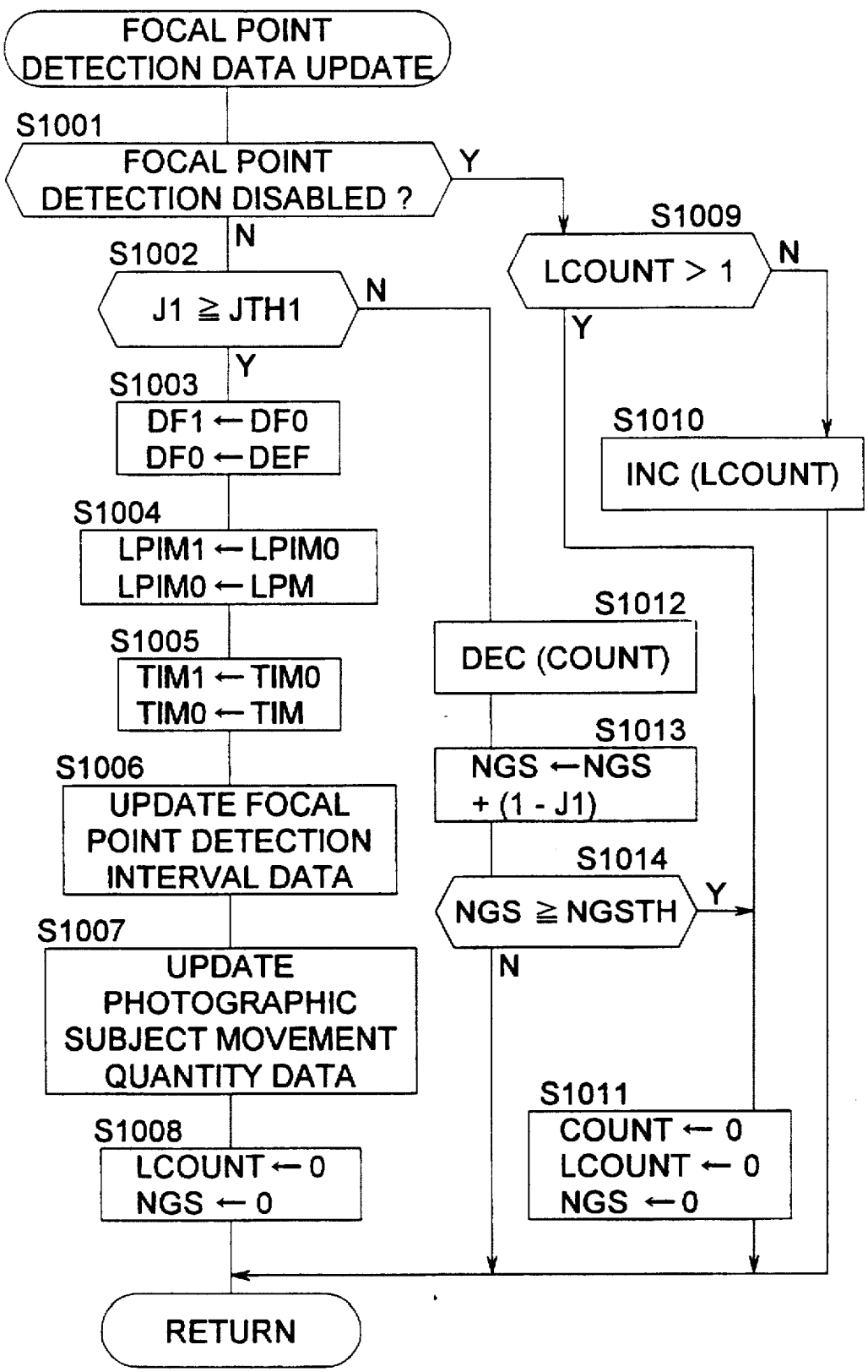
FIG. 16 is a flow chart illustrating the focal point detection data updating subroutine.

(7) Focal point detection data updating subroutine:

In step S516, in FIG. 6, the focal point detection data updating subroutine is executed and its details are shown in FIG. 16.

In step S1001, in FIG. 16, a decision is made as to whether or not the most recent focal point detection is disabled based upon the state of the detection disable flag. If a negative decision is made, i.e., if the focal point detection is possible, the operation proceeds to step S1002. In step S1002, a decision is made as to whether or not the identical photographic subject reliability J1, calculated in step S603 (FIG. 8) described above, is equal to or larger than a specific value, JTH1. If an affirmative decision is made, the operation proceeds to step S1003.

In step S1003, the defocusing quantity DF0, obtained previously, is stored in DF1 and the defocusing quantity DEF, obtained in the current operation, is stored in DF0. In step S1004, the lens position LPIM0 at the previous accumulation center time is stored in LPIM1 and the lens position LPM at the most recent accumulation center time is stored in LPIM0. In step S1005, the detection time interval TIM0 in the previous operation is stored in TIM1 and the detection time interval TIM obtained in the current operation is stored in TIM0. In step S1006, the focal point detection interval times TN1, TN2 and TN3 are updated. In TN1, the time interval between the most recent focal point detection time and the focal point detection time immediately before that, is stored.

In step S1007, the photographic subject movement quantity data PN1, PN2 and PN3 are updated. In step S1008, the LCOUNT, which indicates the number of continuous times for which focal point detection was not possible, is cleared to 0. In addition, the variable parameter NGS, which stores in memory the sum of the degrees of reliability when the results of focal point detections have not been stored in memory owing to low degrees of reliability, is cleared to 0. In other words, since the most recent degree of reliability is equal to or more than a specific value, the variable parameter NGS that indicates that there are data with low degrees of reliability in succession, is cleared. Then the processing returns to the routine shown in FIG. 7.

On the other hand, if it is decided in step S1001 that focal point detection is disabled, the operation proceeds to step S1009, in which a decision is made as to whether or not the focal point detection has been disabled twice in a row. If a negative decision is made in step S1009, the operation proceeds to step S1010 and the variable parameter LCOUNT, which indicates the number of times for which detection was disabled, is incremented. If an affirmative decision is made in step S1009, i.e., if focal point detection has been disabled twice in a row, the operation proceeds to step S1011, in which the variable parameter COUNT, which indicates the number of data that can be used for prediction calculation, is cleared to 0 in order to invalidate the previous focal point detection results. Then the variable parameter LCOUNT, which indicates the number of times the detection has been disabled in succession, is cleared to 0 and the variable parameter NGS, which indicates that there have been data with low degrees of reliability in succession, is also cleared to 0.

If a negative decision is made in step S1002, that is, if the identical photographic subject reliability based upon the most recent focal point detection results is low, the operation proceeds to step S1012. In step S1012, since there is a possibility of an error affecting the subsequent prediction calculation, the variable parameter COUNT, which indicates the number of data to be used for prediction calculation, is decremented. In other words, these results are not stored in memory. In step S1013, the variable parameter NGS, which indicates that data with low degrees of reliability have been detected in succession, is calculated using the following formula:

$$NGS \leftarrow NGS + (1 - J1)$$

In step S1014, a decision is made as to whether or not the variable parameter NGS, which indicates that data with low degrees of reliability have been detected in succession, is equal to or larger than a specific value NGSTH, and if an affirmative decision is made, the operation proceeds to step S1011 described above, to invalidate the previous focal point detection results. If a negative decision is made in step S1014, it is decided that the reliability of the focal point detection results happen to be low at this particular time, and only the most recent focal point detection results are invalidated. By not storing the focal point detection results with low degrees of reliability in memory in this manner, a possible erroneous decision is prevented in the subsequent identical photographic subject decision-making. After this, the processing returns to the routine shown in FIG. 7.

<<Focusing decision subroutine>>

When the processing returns to the routine shown in FIG. 7, the prediction calculation subroutine is completed and the processing now returns to the main routine shown in FIG. 2.

Figure 17:
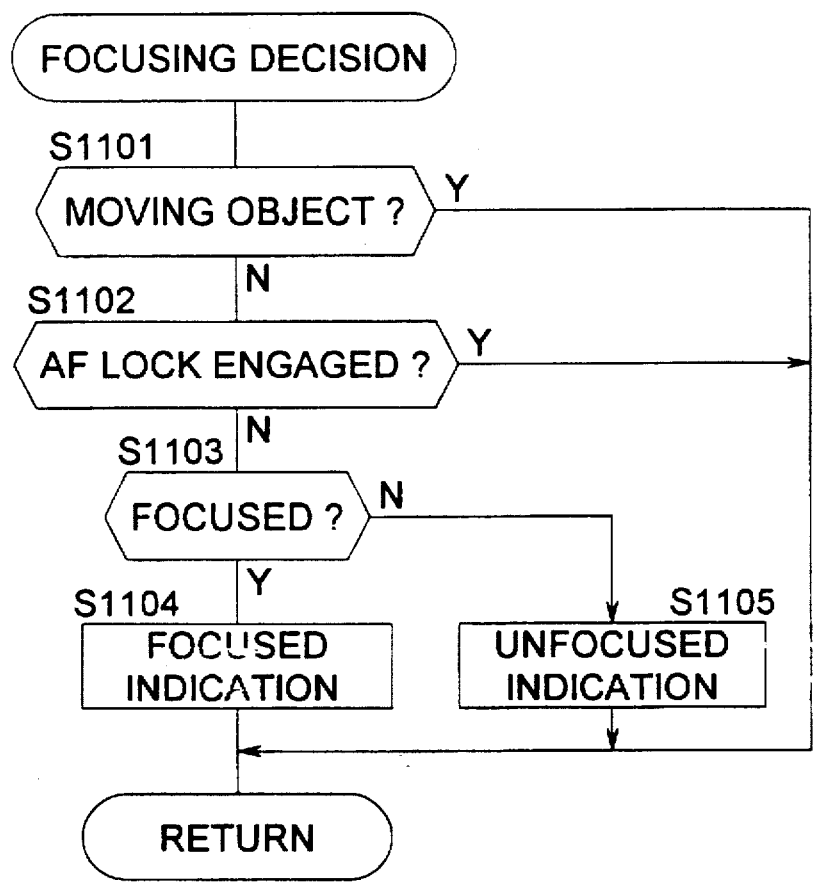
FIG. 17 is a flow chart illustrating the focusing decision subroutine.

FIG. 17 shows details of the focusing decision subroutine executed in step S107 (FIG. 2).

In FIG. 17, a decision is made as to whether or not the photographic subject is a moving object, based upon the state of the moving object flag in step S1101. If it is determined to be a moving object, the operation returns as is, without making a focusing decision. If the photographic subject is not a moving object, the operation proceeds to step S1102, in which a decision is made as to whether or not an AF lock button has been pressed. The AF lock button is pressed in order to fix the photographic lens at the current position by prohibiting the focusing drive of the photographic lens. If an affirmative decision is made in step S1102, the operation returns as is, and if a negative decision is made, the operation moves on to step S1103. In step S1103, a decision is made as to whether or not the photographic lens is in the focused state. If it is, focus indication is set in step S1104. If it is not, the operation proceeds to step S1105, in which unfocused indication is set. After that, the processing returns to the main routine shown in FIG. 2.

<<Lens Drive Subroutine>>

Figure 18:
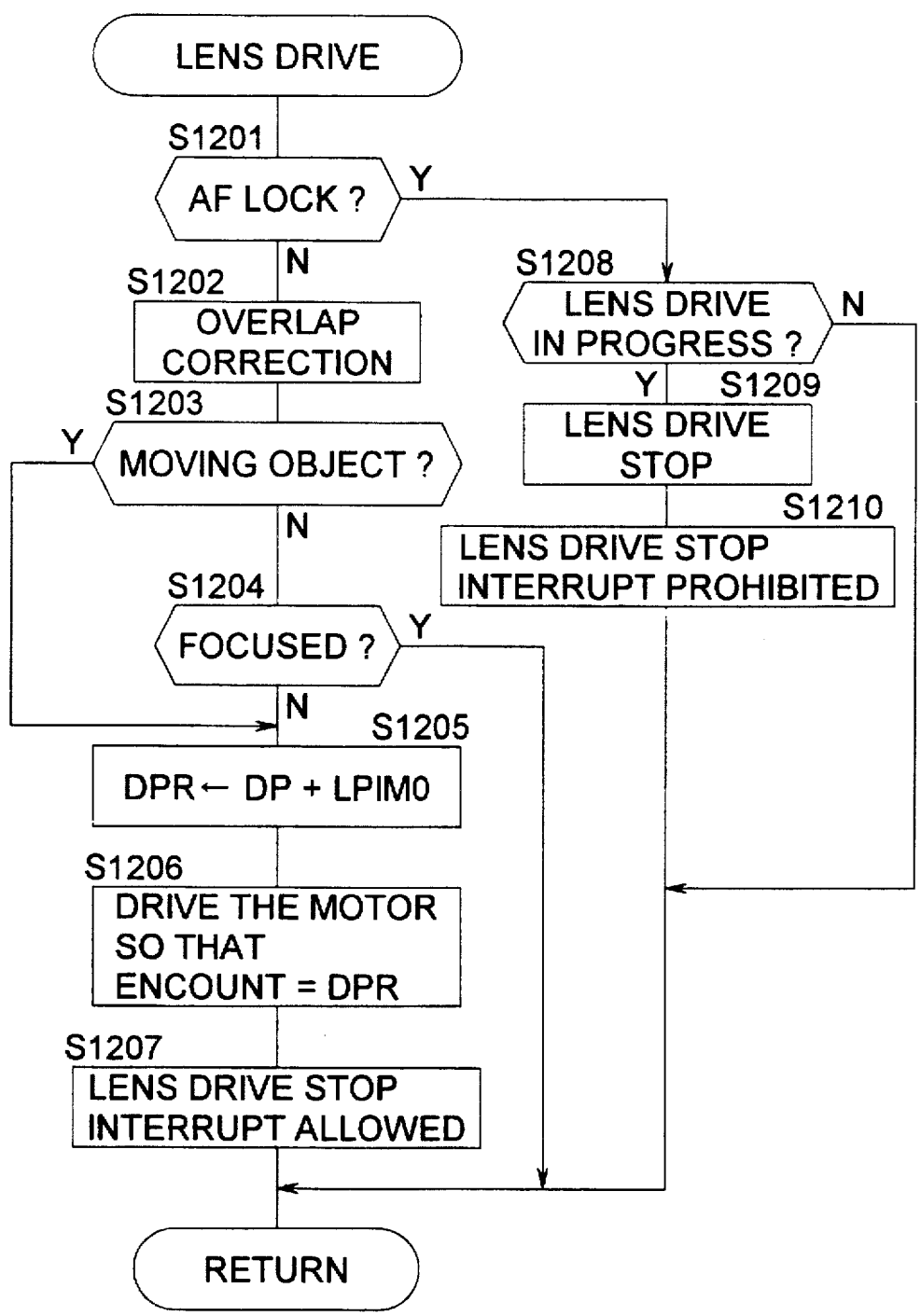
FIG. 18 is a flow chart illustrating the lens drive subroutine.
Figure 19:
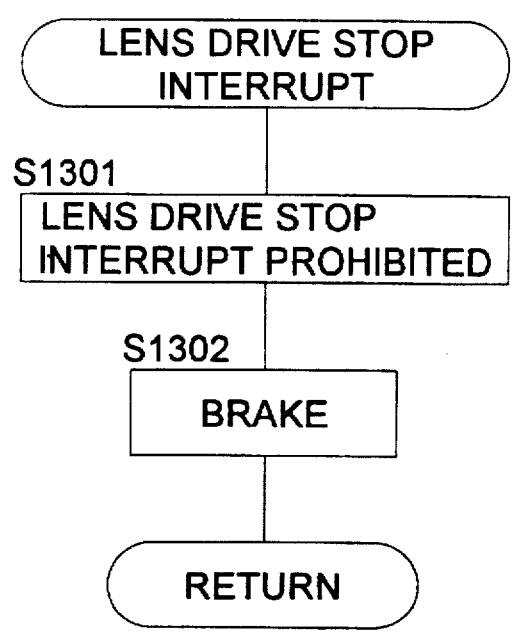
FIG. 19 is a flow chart illustrating the lens drive stop interrupt subroutine.

FIGS. 18 and 19 show details of the lens drive subroutine performed in step S108 (FIG. 2). The lens drive, as referred to in this context, is equivalent to the operation in which the focusing optical system of the photographic lens is driven in the direction of the optical axis for focusing.

In step S1201, a decision is made as to whether or not the AF lock button has been pressed. If it has not been pressed, the operation proceeds to step S1202. In step S1202, overlap correction is performed, to correct the distance that the lens has moved after the most recent focal point detection time, up to the current time. The overlap correction is of known technology and so a detailed explanation of it is omitted here.

In step S1203, a decision is made as to whether or not the photographic subject is a moving object, based upon the state of the moving object flag. If is determined to be a moving object, the operation proceeds to step S1205. If not, the operation proceeds to step S1204. In step S1204, a decision is made as to whether or not the photographic lens is in focus. If it is, the operation returns as is, without performing lens drive. If not, the operation proceeds to step S1205 in which the lens drive target position DPR is calculated using the following formula, based upon the lens drive quantity DP, calculated based upon the prediction time TP in step S504, shown in FIG. 6, and the lens position LPIM0 at the accumulation center time in the most recent operation.

DPR←DP+LPIM0

In step S1206, the supplied voltage to the motor 10 is changed so that the count value ECOUNT of the pulses sent form the encoder 11 will be DPR. With this, the motor 10 rotates. In step S1207, the lens drive stop interrupt is allowed, and after that the processing returns to the routine shown in FIG. 2. This lens drive stop interrupt is performed when the count value ECOUNT becomes DPR.

If it is decided that the AF lock button has been pressed in step S1201, the operation proceeds to step S1208, in which a decision is made as to whether or not lens drive is in progress. If lens drive is not in progress, the operation returns as is, to the processing shown in FIG. 2. If lens drive is in progress, the operation proceeds to step S1209. In step S1209, a brake is applied to the motor 10 to stop the lens. In step S1210, the lens drive stop interrupt is prohibited and after that the processing returns to the routine shown in FIG. 2.

FIG. 19 shows details of the lens drive interrupt processing.

In FIG. 19, since the lens drive quantity has reached the target value in step S1301, the lens drive stop interrupt is prohibited. In step S1302, the motor 10 is shorted and the brake is applied so that the motor 10 is stopped.

Second Embodiment

Figure 20:
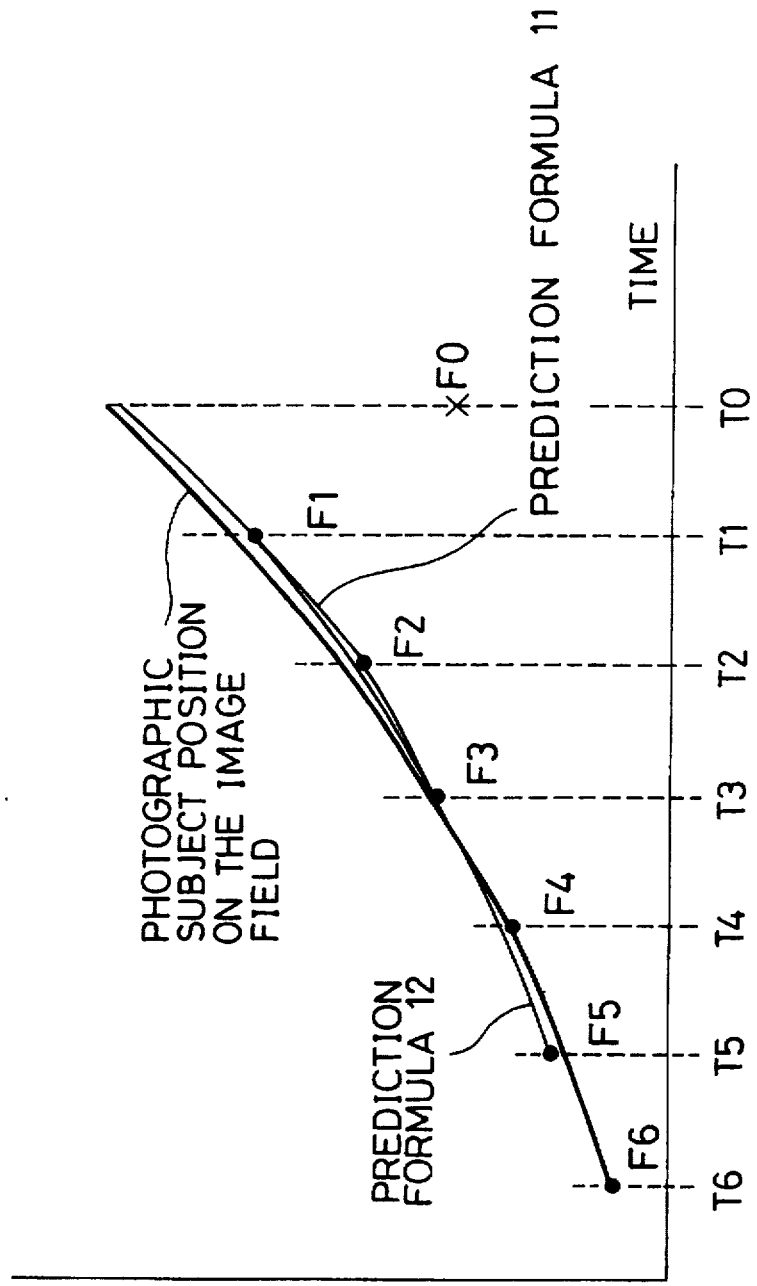
FIG. 20 is a graph illustrating the principle of photographic subject decision-making in the second embodiment.
Figure 21:
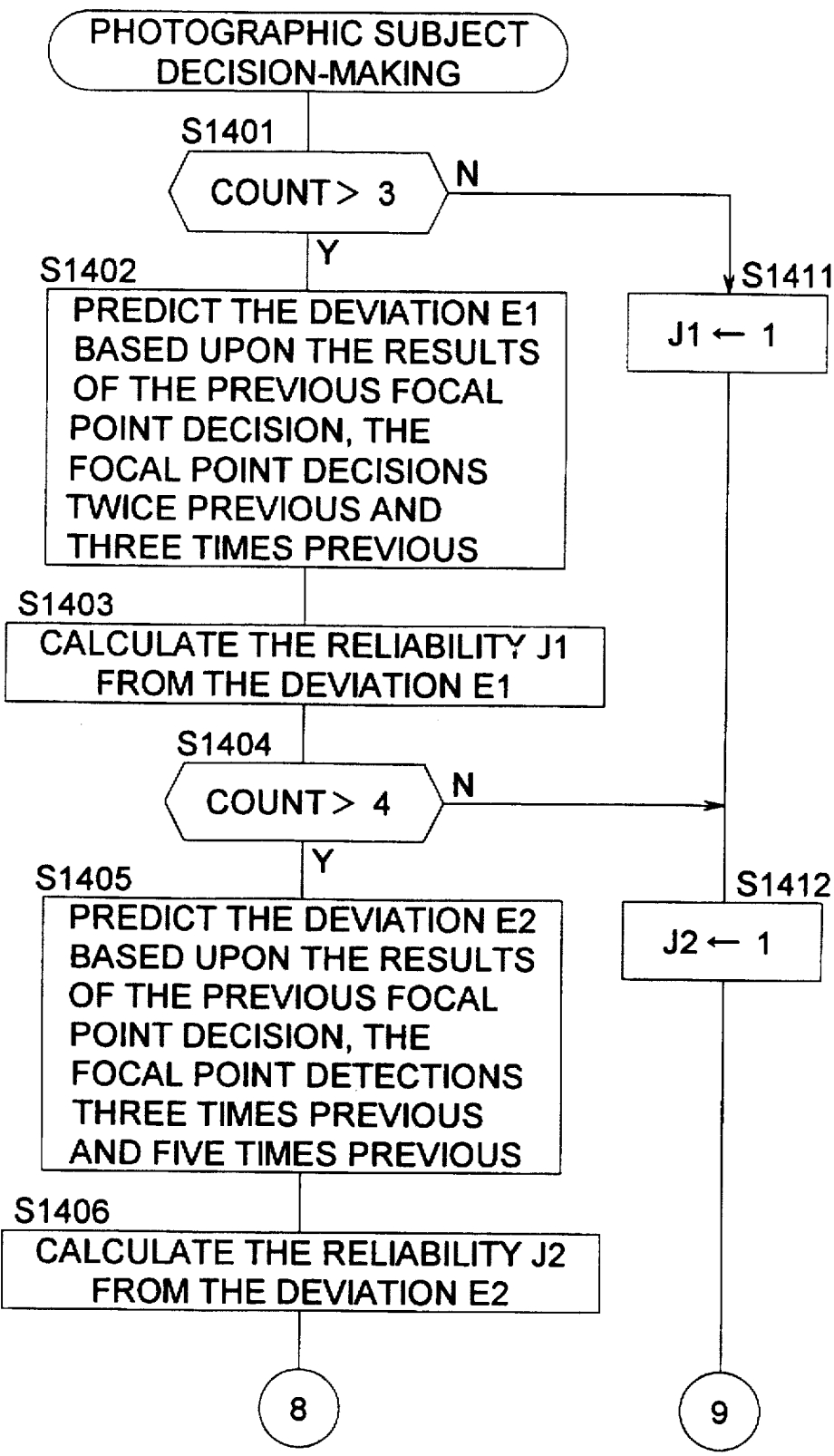
FIGS. 21 and 22 are a flow chart illustrating the photographic subject decision-making subroutine in the second embodiment.
Figure 22:
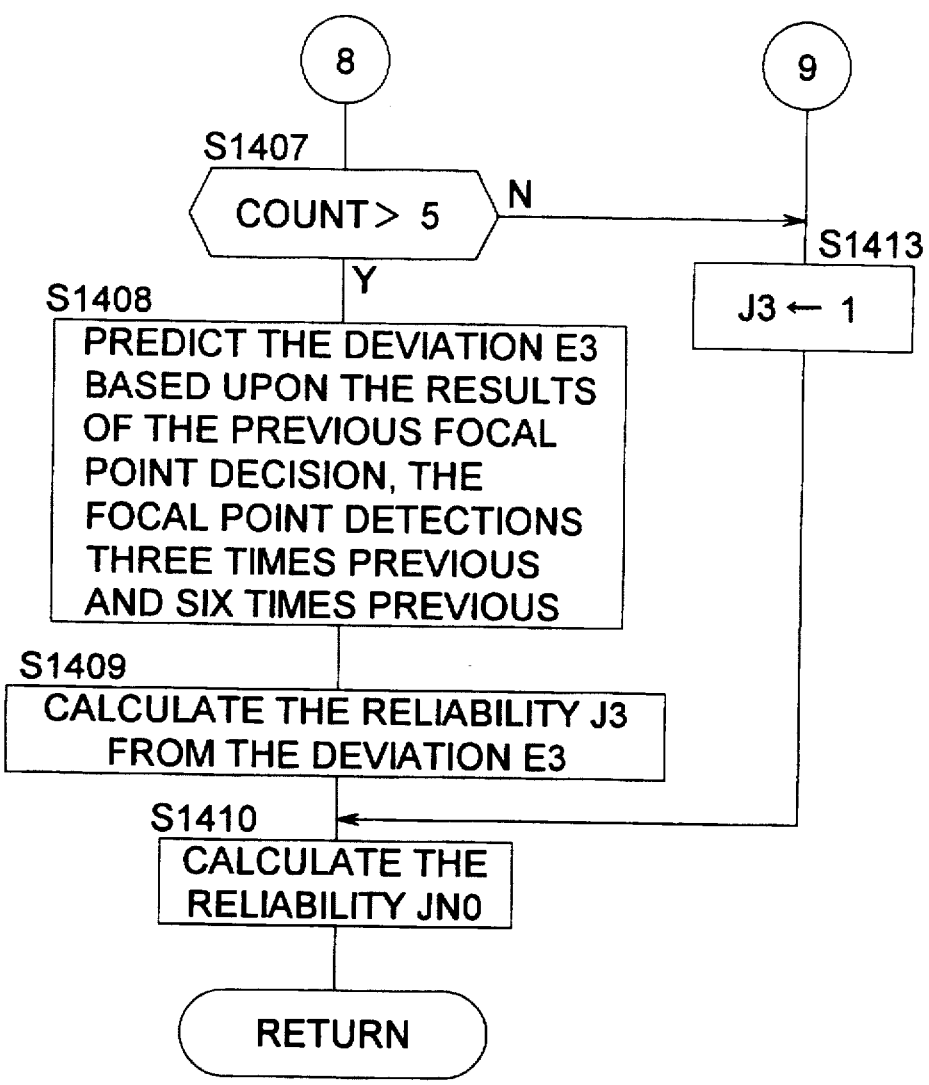

The second embodiment of the present invention is explained in reference to FIGS. 20–22.

While linear expressions were used when predicting the photographic subject position in the photographic subject decision-making subroutine in the first embodiment, quadratic expressions are used in this second embodiment.

FIGS. 21 and 22 show the subroutine for photographic subject decision-making (corresponding to the subroutine shown in FIGS. 8 and 9) in this embodiment.

In step S1401, a decision is made as to whether or not the number of data COUNT which can be used for prediction calculation, is larger than 3. If an affirmative decision is made, the operation proceeds to step S1402, in which the predicted photographic subject position on the image field at the time of the most recent focal point detection is calculated based upon the results of the previous focal point detection, the one twice previous, and the one three times previous. The deviation between this predicted position and the position of the photographic subject that is obtained from the results of the most recent focal point detection is calculated.

In other words, the factors A and B that constitute the quadratic approximation (prediction formula 11) are calculated with the following formulae, using F1, F2 and F3 and T1, T2 and T3 shown in FIG. 20.

$$A \leftarrow \frac{(T2-T3) \times (F1-F2) - (T1-T2) \times (F2-F3)}{(T1-T2) \times (T2-T3) \times (T1-T2)}$$

$$B \leftarrow \frac{(T2-T3) \times (T2-T3) \times (F1-F2) - (T1-T2) \times (T1-T2) \times (F2-F3)}{(T1-T2) \times (T2-T3) \times (T1-T2)}$$

Next, the deviation E1 between the photographic subject position predicted using the prediction formula 11 and the actual photographic subject position F0 is calculated.

In step S1403, the identical photographic subject reliability J1, which indicates the degree of correspondence between the photographic subject for which the current focal point detection was performed and the photographic subject for which focal point detection was performed in a past accumulation operation, is calculated using the characteristics shown in FIG. 11, based upon the deviation E1 described above. On the other hand, if a negative decision is made in step S1401, the operation proceeds to S1411 in which "1" is set for J1 and the operation proceeds to step S1412.

In step S1404, a decision is made as to whether or not the number of data COUNT which can be used for prediction calculation, is larger than 4. If an affirmative decision is made, the operation proceeds to step S1405, in which the predicted position of the photographic subject at the time of the most recent focal point detection is calculated using a quadratic expression approximation (prediction formula 12) based upon the results of the previous focal point detection, the one three times previous and the one five times previous. The deviation E2 between this predicted position and the position of the photographic subject that is obtained from the results of the most recent focal point detection is then calculated.

In step S1406, the identical photographic subject reliability J2, which indicates the degree of correspondence between the photographic subject for which current focal point detection was performed and the photographic subject for which focal point detection was performed in a past operation, is calculated using similar characteristics to those shown in FIG. 11, based upon the deviation E2. On the other hand, if a negative decision is made is step S1404, the operation proceeds to S1412, in which "1" is set for J2 and the operation proceeds to step S1413.

In step S1407, a decision is made as to whether or not the number of data COUNT that can be used for prediction calculation, is larger than 5. If an affirmative decision is made, the operation proceeds to step S1408, in which the predicted position of the photographic subject at the time of the most recent focal point detection is calculated using a quadratic expression approximation based upon the results of the previous focal point detection, the one three times previous and the one six times previous. The deviation E3 between this predicted position and the position of the photographic subject that is obtained from the results of the most recent focal point detection is calculated.

In step S1409, the identical photographic subject reliability J3, which indicates the degree of correspondence between the photographic subject for which focal point detection was performed in the most recent accumulation operation and the photographic subject for which focal point detection was performed in a past accumulation operation, is calculated using similar characteristics to those shown in FIG. 11, based upon the deviation E3. On the other hand, if a negative decision is made is step S1407, the operation proceeds to S1413 in which "1" is set for J3 and the operation proceeds to step S1410.

In step S1410, the reliability value JN0, which indicates whether or not the photographic subject for which focal point detection was performed in the most recent focal point detection is the same as the photographic subject for which focal point detection was performed in the past is calculated based upon the degrees of reliability J1, J2 and J3 using the following formula.

$$JN0=(J1+J2+J3)/3$$

Note that the other control aspects are the same as those of the first embodiment.

So far, examples were given in which the most recent photographic subject position is predicted using linear expressions or quadratic expressions. However, the photographic subject position may be predicted using higher order expressions, including third-order expressions. Also, examples were shown in which the identical photographic subject reliability is calculated based upon the deviation between the most recent predicted photographic subject position and the actual photographic subject position. However, the reliability may be calculated using other methods. Additionally, the characteristics used when determining the reliability based upon the deviation described above are not limited to those shown in FIG. 11. Furthermore, the arithmetic expression for calculating the photographic subject prediction time TP is not limited to that shown in FIG. 15 either. Also, the method with which the decision level SC1-SC3 of the photographic subject moving speed on the image field are determined is not limited to the expression shown in FIG. 14.

I claim:

1. A photographic subject position predicting apparatus comprising:
   a focal point detection device that detects a focal point adjustment state of a photographic lens,
   a memory device that stores in memory said focal point adjustment state detected by said focal point detection device,
   a reliability calculation device that calculates an identical photographic subject reliability, which indicates a possibility of a photographic subject for which focal point detection has been performed in a most recent operation being the same as a photographic subject for which focal point detection was performed in a previous operation, based upon a most recent focal point adjustment state detected by said focal point detection device and a past focal point adjustment state stored in said memory device, said identical photographic subject reliability indicting a probability of the photographic subject for which focal point detection has been performed in the most recent operation being the same as the photographic subject for which focal point detection was performed in the previous operation, said probability changing as a real value on a continuum between and including a minimum value and a maximum value,
   a moving speed calculation device which calculates a predicted moving speed of said photographic subject, based upon said identical photographic subject reliability calculated by said reliability calculation device, and
   a prediction device that predicts a future position of said photographic subject based upon said predicted photographic subject moving speed calculated by said moving speed calculation device.

2. A photographic subject position predicting apparatus according to claim 1 further comprising;
   a focal point adjustment state calculation device that calculates a predicted focal point adjustment state, relative to a current photographic lens position, after a specific length of time has elapsed, based upon the most recent focal point adjustment state detected by said focal point detection device and said identical photographic subject reliability calculated by said reliability calculation device, wherein;
   said prediction device predicts the future position of said photographic subject based upon said predicted photographic subject moving speed calculated by said moving speed calculation device and said predicted focal point adjustment state calculated by said focal point adjustment state calculation device.

3. A photographic subject position predicting apparatus according to claim 1 wherein;
   said predicted moving speed calculated by said moving speed calculation device, refers to a predicted photographic subject moving speed on an image field that is calculated based upon the most recent focal point adjustment state detected by said focal point detection device, the past focal point adjustment state stored in said memory device, a time elapsed after a detection of said past focal point adjustment state until a detection of said most recent focal point adjustment state, and said identical photographic subject reliability calculated by said reliability calculation device.

4. A photographic subject position predicting apparatus according to claim 1 wherein;
   said reliability calculation device includes;
   a first calculation device which calculates a most recent photographic subject predicted position based upon a plurality of past focal point adjustment states stored in said memory device,
   a second calculation device which calculates a deviation between a photographic subject position based upon said most recent focal point adjustment state detected by said focal point detection device and said most recent photographic subject predicted position calculated by said first calculation device, and
   a third calculation device that calculates said identical photographic subject reliability in accordance with said deviation calculated by said second calculation device.

5. A photographic subject position predicting apparatus according to claim 4 wherein;
   said third calculation device calculates said identical photographic subject reliability in such a manner that the smaller said deviation, the higher said identical photographic subject reliability.

6. A photographic subject position predicting apparatus according to claim 5 wherein;
   said first calculation device sets linear expressions for photographic subject position prediction from past photographic subject positions, which are obtained based upon the plurality of past focal point adjustment states, and calculates said most recent photographic subject predicted position using said linear expressions.

7. A photographic subject position predicting apparatus according to claim 5 wherein;
   said first calculation device sets quadratic expressions for photographic subject position prediction from past photographic subject positions, which are obtained based upon the plurality of past focal point adjustment states, and calculates said most recent photographic subject predicted position using said quadratic expression.

8. An automatic focal point adjustment apparatus comprising:
   a focal point detection device that detects a focal point adjustment state of a photographic lens, a memory device which stores in memory said focal point adjustment state detected by said focal point detection device, a reliability calculation device that calculates an identical photographic subject reliability, which indicates a possibility of a photographic subject for which focal point detection has been performed in a most recent operation being the same as the photographic subject for which focal point detection was performed in a previous operation, based upon a most recent focal point adjustment state detected by said focal point detection device and a past focal point adjustment state stored in said memory device, said identical photographic subject reliability indicting a probability of the photographic subject for which focal point detection has been performed in the most recent operation being the same as the photographic subject for which focal point detection was performed in the previous operation, said probability changing as a real value on a continuum between and including a minimum value and a maximum value, a moving speed calculation device which calculates a predicted moving speed of said photographic subject based upon said identical photographic subject reliability calculated by said reliability calculation device, a lens drive quantity calculation device which calculates a lens drive quantity for focusing said photographic lens on a future photographic subject based upon said photographic subject moving speed calculated by said moving speed calculation device, and a focal point adjustment device which performs focal point adjustment for said photographic lens based upon said lens drive quantity calculated by said lens drive quantity calculation device.

9. An automatic focal point adjustment apparatus according to claim 8 further comprising;

a focal point adjustment state calculation device that calculates a predicted focal point adjustment state, relative to a current photographic lens position after a specific length of time has elapsed, based upon a most recent focal point adjustment state detected by said focal point detection device and said identical photographic subject reliability calculated by said reliability calculation device, wherein;

said lens drive quantity calculation device calculates said lens drive quantity for focusing said photographic lens on said future photographic subject position based upon said predicted photographic subject moving speed calculated by said moving speed calculation device and said predicted focal point adjustment state calculated by said focal point adjustment state calculation device.

10. An automatic focal point adjustment apparatus according to claim 8 wherein;

said predicted moving speed which is calculated by said moving speed calculation device refers to a predicted photographic subject moving speed on an image field that is calculated based upon the most recent focal point adjustment state detected by said focal point detection device, the past focal point adjustment state stored in said memory device, a time which has elapsed after a detection of said past focal point adjustment state until a detection of said most recent focal point adjustment state, and said identical photographic subject reliability calculated by said reliability calculation device.

11. An automatic focal point adjustment apparatus according to claim 8 wherein;

said reliability calculation device includes;

a first calculation device which calculates a most recent photographic subject predicted position based upon a plurality of past focal point adjustment states stored in said memory device, a second calculation device which calculates a deviation between a photographic subject position based upon said most recent focal point adjustment state detected by said focal point detection device and said most recent photographic subject predicted position calculated by said first calculation device, and a third calculation device that calculates said identical photographic subject reliability in accordance with said deviation calculated by said second calculation device.

12. An automatic focal point adjustment apparatus according to claim 11 wherein;

said third calculation device calculates said identical photographic subject reliability in such a manner that the smaller said deviation, the higher said identical photographic subject reliability.

13. A photographic subject position predicting apparatus comprising:

a focal point detection means for detecting a focal point adjustment state of a photographic lens, a memory means for storing in memory said focal point adjustment state detected by said focal point detection means, a reliability calculation means for calculating an identical photographic subject reliability, which indicates a possibility of a photographic subject for which focal point adjustment has been performed in a most recent operation being the same as the photographic subject for which focal point adjustment was performed in the previous operation, based upon a most recent focal point adjustment state detected by said focal point detection means and a past focal point adjustment state stored in said memory means, said identical photographic subject reliability indicting a probability of the photographic subject for which focal point detection has been performed in the most recent operation being the same as the photographic subject for which focal point detection was performed in the previous operation, said probability changing as a real value on a continuum between and including a minimum value and a maximum value, a moving speed calculation means for calculating a predicted moving speed of said photographic subject based upon said identical photographic subject reliability calculated by said reliability calculation means, and a prediction means for predicting a future position of said photographic subject based upon said predicted photographic subject moving speed calculated by said moving speed calculation means.

* * * * *